US012773804B2

(12) United States Patent
Burke et al.

(10) Patent No.: US 12,773,804 B2
(45) Date of Patent: Oct. 27, 2026

(54) SAFETY BRAKES FOR CIRCULAR SAW BLADES, CIRCULAR SAWS THAT INCLUDE THE SAFETY BRAKES, AND METHODS OF OPERATING CIRCULAR SAWS

(71) Applicant: Festool GmbH, Wendlingen am Neckar (DE)

(72) Inventors: Jeremy Burke, Newberg, OR (US); Christian Schock, Schorndorf (DE); Markus Schmid, Uhingen (DE); Matthias Dennis Kübeler, Kirchheim unter Teck (DE); Felix Theurer, Pforzheim (DE); Manuel Bäuerle, Filderstadt (DE); Josua Frank, Urbach (DE)

(73) Assignee: Festool GmbH, Wendlingen am Neckar (DE)

( * ) Notice: Subject to any disclaimer, the term of this patent is extended or adjusted under 35 U.S.C. 154(b) by 867 days.

(21) Appl. No.: 18/001,536

(22) PCT Filed: Jun. 24, 2021

(86) PCT No.: PCT/EP2021/067386
§ 371 (c)(1),
(2) Date: Dec. 12, 2022

(87) PCT Pub. No.: WO2022/002759
PCT Pub. Date: Jan. 6, 2022

(65) Prior Publication Data

US 2023/0278251 A1 Sep. 7, 2023

Related U.S. Application Data

(60) Provisional application No. 63/046,924, filed on Jul. 1, 2020.

(51) Int. Cl.
*B27B 5/38* (2006.01)
*B27G 19/00* (2006.01)
(Continued)

(52) U.S. Cl.
CPC ............ *B27B 5/381* (2024.05); *B27G 19/008* (2024.05); *F16D 55/224* (2013.01);
(Continued)

(58) Field of Classification Search
CPC ..... B27B 5/38; F16D 55/224; F16D 2121/20; F16D 2125/32; F16D 2127/02; B23Q 11/0082; B27G 19/00; B27G 21/00
(Continued)

(56) References Cited

U.S. PATENT DOCUMENTS 3,785,230 A * 1/1974 Lokey ................ B23Q 11/0092
30/388
4,026,177 A 5/1977 Lokey
(Continued)

FOREIGN PATENT DOCUMENTS

CN 103492245 A 1/2014
CN 208195813 U 12/2018
(Continued)

OTHER PUBLICATIONS

International search report for corresponding patent application PCT/EP2021/067386, dated Sep. 16, 2021, 13 bages (not prior art).
(Continued)

*Primary Examiner* — Jennifer S Matthews
(74) *Attorney, Agent, or Firm* — Lucian Wayne Beavers; Patterson Intellectual Property Law, PC

(57) ABSTRACT

Safety brakes for circular saw blades, circular saws that include the safety brakes, and methods of operating circular saws are disclosed herein. The safety brakes include a sensor assembly, a brake assembly, and an actuator assembly. The
(Continued)

sensor assembly is configured to detect an actuation parameter and to generate a trigger signal responsive to detection of the actuation parameter. The brake assembly includes a brake cam and a brake pad. The brake cam is configured to selectively transition between a disengaged configuration and an engaged configuration and is configured to operatively engage a planar side surface of the circular saw blade. The brake pad includes a pad friction material and is positioned such that the pad friction material faces toward the brake cam. The actuator assembly is configured to selectively transition the brake cam from the disengaged configuration to the engaged configuration responsive to receipt of the trigger signal.

21 Claims, 16 Drawing Sheets

(51) Int. Cl.

| | |
|---|---|
| ***F16D 55/224*** | (2006.01) |
| *F16D 121/20* | (2012.01) |
| *F16D 125/32* | (2012.01) |
| *F16D 127/02* | (2012.01) |

(52) U.S. Cl.
CPC ...... *F16D 2121/20* (2013.01); *F16D 2125/32* (2013.01); *F16D 2127/02* (2013.01)

(58) Field of Classification Search
USPC .............................................. 83/58, 62, 62.1
See application file for complete search history.

(56) References Cited

U.S. PATENT DOCUMENTS

| | | | | |
|---|---|---|---|---|
| 7,055,417 | B1 * | 6/2006 | Gass | H01H 27/00 83/477.1 |
| 7,137,326 | B2 * | 11/2006 | Gass | F16P 3/12 83/485 |
| 8,931,386 | B2 | 1/2015 | Lawlor | |
| 9,045,116 | B2 | 6/2015 | Takahashi et al. | |
| 10,967,537 | B2 | 4/2021 | Wiker et al. | |
| 11,298,763 | B2 | 4/2022 | Crabb et al. | |
| 11,940,095 | B2 | 3/2024 | Gass et al. | |
| 2002/0170399 | A1 * | 11/2002 | Gass | B27G 19/02 83/DIG. 1 |
| 2004/0226424 | A1 * | 11/2004 | O'Banion | F16P 3/144 83/397 |
| 2008/0078470 | A1 * | 4/2008 | O'Branion | F16P 3/14 700/90 |
| 2011/0048194 | A1 | 3/2011 | Groth et al. | |
| 2011/0079124 | A1 * | 4/2011 | Carrier | B23D 47/08 83/63 |
| 2012/0160073 | A1 * | 6/2012 | Lawlor | B23D 45/044 83/471.3 |
| 2012/0260785 | A1 * | 10/2012 | Carrier | B26D 7/24 83/62.1 |
| 2014/0052339 | A1 * | 2/2014 | Takahashi | B60T 8/00 701/41 |
| 2014/0083269 | A1 | 3/2014 | Carrier et al. | |
| 2016/0167248 | A1 * | 6/2016 | O'Banion | F16P 3/148 83/62.1 |
| 2019/0016006 | A1 | 1/2019 | Gass | |
| 2019/0076940 | A1 * | 3/2019 | Crabb | B27B 5/29 |
| 2019/0381688 | A1 * | 12/2019 | Wiker | B27B 5/38 |
| 2020/0198079 | A1 | 6/2020 | Bao | |
| 2022/0042648 | A1 * | 2/2022 | Gass | F16P 3/12 |

FOREIGN PATENT DOCUMENTS

| | | | | | |
|---|---|---|---|---|---|
| CN | 109476033 | A | | 3/2019 | |
| CN | 110234478 | A | | 9/2019 | |
| CN | 110744120 | A | | 2/2020 | |
| FR | 2703943 | A1 | | 10/1994 | |
| GB | 245208 | A | * | 1/1926 | B23D 51/20 |
| GB | 390085 | A | * | 3/1933 | B26D 1/385 |
| TW | 201302356 | A | | 1/2013 | |
| WO | 03006213 | A2 | | 1/2003 | |

OTHER PUBLICATIONS

Taiwan Search Report for corresponding patent application No. 110124205, received Dec. 27, 2024, 1 page (not prior art).
China Office Action for corresponding patent application No. 2024101601623850, dated Oct. 16, 2024, 10 pages (not prior art).

* cited by examiner

SAFETY BRAKES FOR CIRCULAR SAW BLADES, CIRCULAR SAWS THAT INCLUDE THE SAFETY BRAKES, AND METHODS OF OPERATING CIRCULAR SAWS

RELATED APPLICATION

This application claims priority to U.S. Provisional Patent Application No. 63/046,924, which was filed on Jul. 1, 2020, and the complete disclosure of which is hereby incorporated by reference.

FIELD OF THE DISCLOSURE

The present disclosure relates generally to safety brakes for circular saw blades, to circular saws that include the safety brakes, and/or to methods of operating the circular saws.

BACKGROUND OF THE DISCLOSURE

Circular saws utilize a rotating circular saw blade to cut a workpiece. The rotating circular saw blade generally is sharp and can, in some instances, represent a safety hazard to a user of the circular saw. Many circular saws include blade guards and/or other mechanisms to protect the user from contact with the rotating circular saw blade. However, it still may be desirable to have secondary and/or additional safety mechanisms in place. Some such secondary and/or additional safety mechanisms have been developed; however, they generally are one-time-use safety mechanisms that may be destructive to the circular saw blade and/or to at least one component of the safety mechanism. Additionally, or alternatively, known secondary and/or additional safety mechanisms may not be amenable to installation in a wide range of circular saws, including larger installed circular saws and smaller and/or portable circular saws. Thus, there exists a need for improved safety brakes for circular saw blades, for circular saws that include the safety brakes, and/or for methods of operating circular saws.

SUMMARY OF THE DISCLOSURE

Safety brakes for circular saw blades, circular saws that include the safety brakes, and methods of operating circular saws are disclosed herein. The safety brakes include a sensor assembly, a brake assembly, and an actuator assembly. The sensor assembly is configured to detect an actuation parameter and to generate a trigger signal responsive to detection of the actuation parameter. The brake assembly includes a brake cam and a brake pad. The brake cam is configured to selectively transition between a disengaged configuration, in which the brake cam is spaced apart from a blade-receiving region of the safety brake, and an engaged configuration, in which the brake cam extends into the blade-receiving region and is configured to operatively engage a planar side surface of the circular saw blade and to resist rotation of the circular saw blade. The brake pad includes a pad friction material and is positioned, relative to the brake cam, such that the pad friction material faces toward the brake cam. The actuator assembly is configured to selectively transition the brake cam from the disengaged configuration to the engaged configuration responsive to receipt of the trigger signal from the sensor assembly.

The methods include rotating a circular saw blade of a circular saw and detecting, with a sensor assembly, that a distance between an individual and the circular saw blade is less than a threshold distance. The methods also include stopping rotation of the circular saw blade responsive to the detecting. The stopping includes stopping utilizing a brake assembly of the circular saw. The brake assembly includes a brake cam and a brake pad, and the stopping includes operatively engaging a planar side surface of the circular saw blade with the brake cam and compressing the circular saw blade between the brake cam and the brake pad.

DETAILED DESCRIPTION AND BEST MODE OF THE DISCLOSURE

Figure 1:
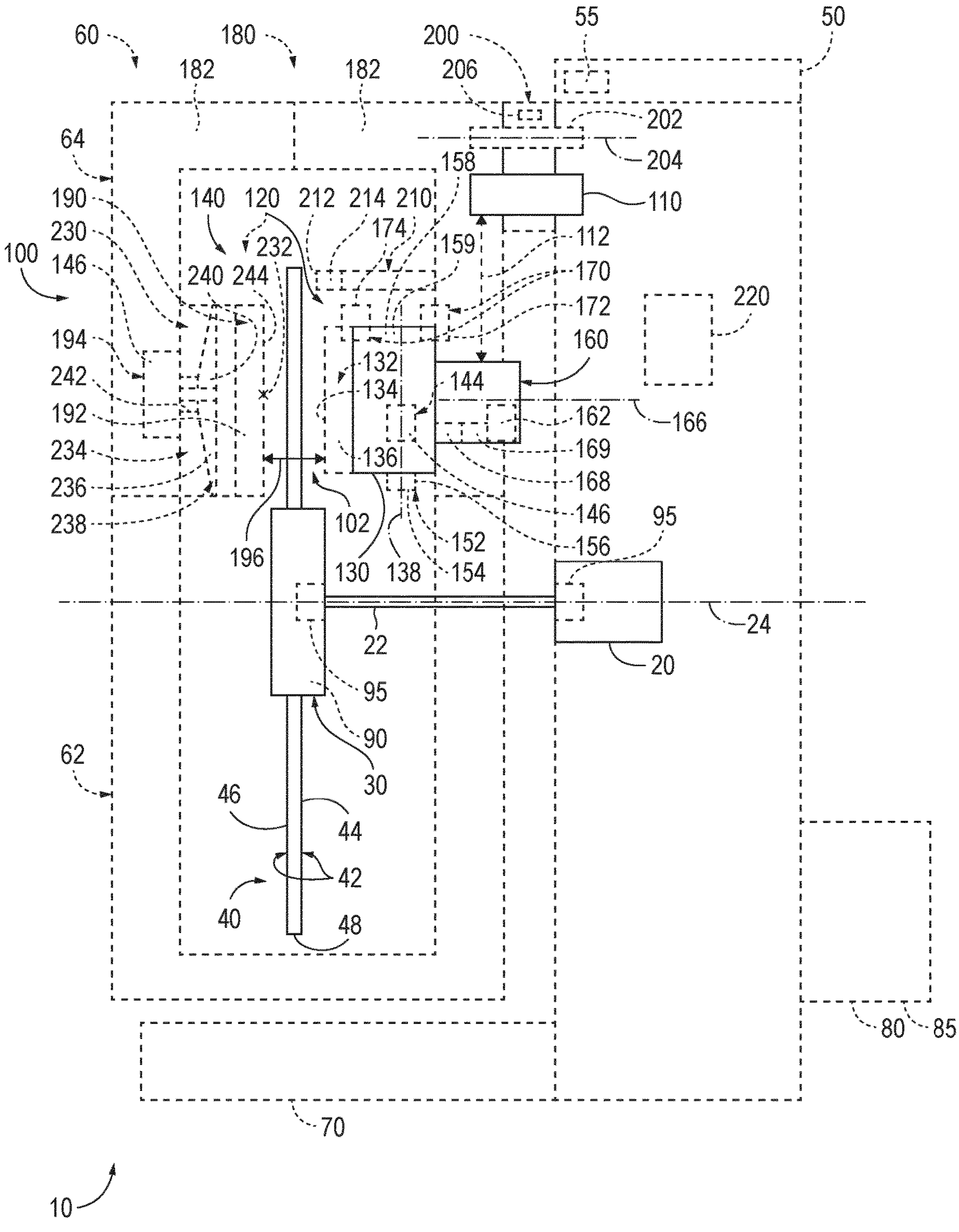
FIG. 1 is a schematic illustration of examples of a safety brake for a circular saw, according to the present disclosure, illustrating the safety brake in a disengaged configuration.

FIGS. 1-21 provide examples of safety brakes 100 for circular saw blades 40 of circular saws 10, of circular saws 10 that include safety brakes 100, and/or of various steps in methods 1000 of operating the circular saws. Elements that serve a similar, or at least substantially similar, purpose are labeled with like numbers in each of FIGS. 1-21, and these elements may not be discussed in detail herein with reference to each of FIGS. 1-21. Similarly, all elements may not be labeled in each of FIGS. 1-21, but reference numerals associated therewith may be utilized herein for consistency. Elements, components, and/or features that are discussed herein with reference to one or more of FIGS. 1-21 may be included in and/or utilized with any of FIGS. 1-21 without departing from the scope of the present disclosure.

In general, elements that are likely to be included in a particular embodiment are illustrated in solid lines, while elements that are optional are illustrated in dashed lines. However, elements that are shown in solid lines may not be essential to all embodiments and, in some embodiments, may be omitted without departing from the scope of the present disclosure.

Figure 2:
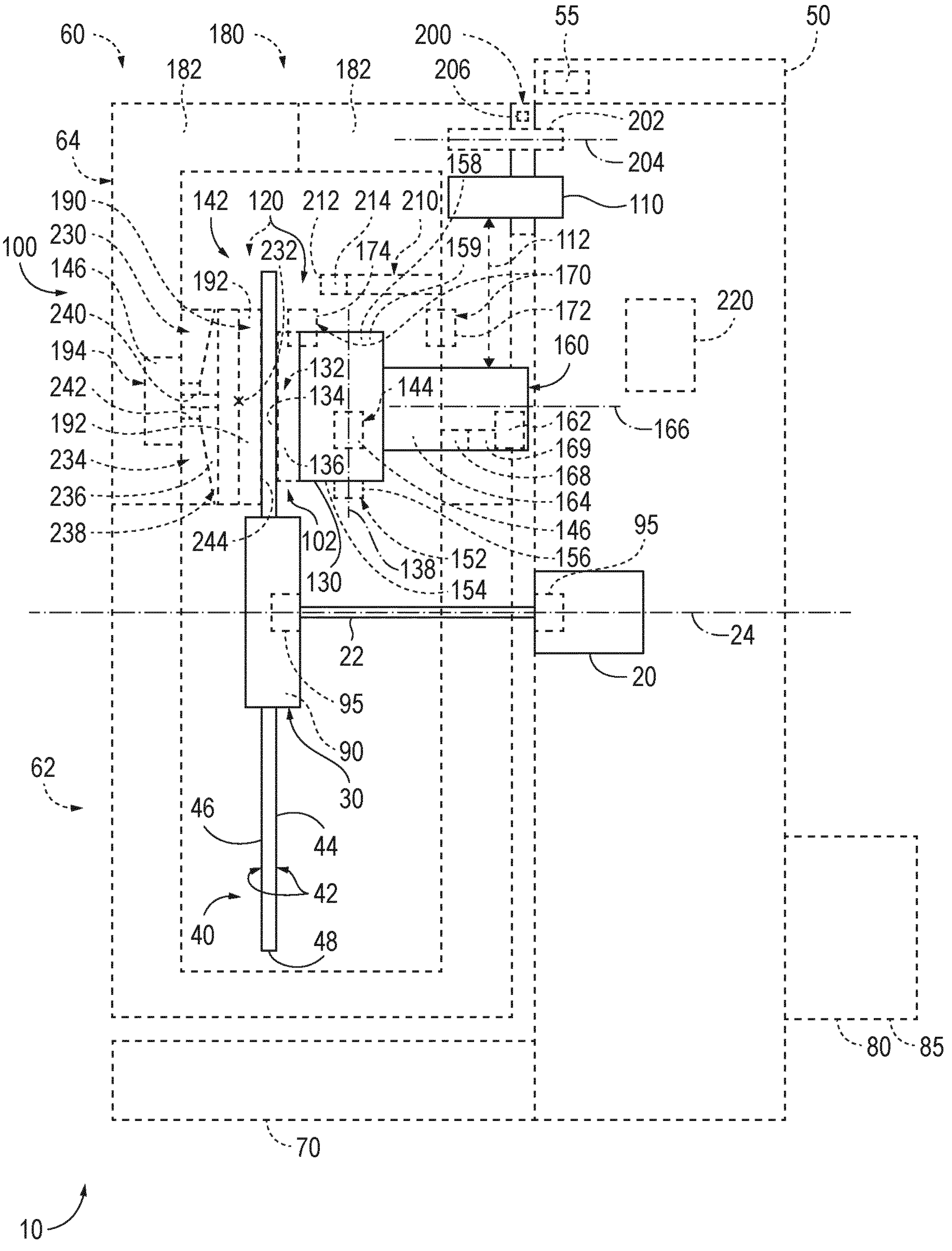
FIG. 2 is an illustration of examples of the safety brake of FIG. 1, with the safety brake illustrated in an engaged configuration.

Circular saws 10 that may include and/or utilize safety brakes 100 and/or components thereof, according to the present disclosure, are illustrated schematically in FIGS. 1-2 and less schematically in FIGS. 3-20. As perhaps best illustrated in FIGS. 1-2, circular saws 10 include a motor 20, an arbor 30, and a circular saw blade 40. The motor includes a motor shaft 22 configured to rotate about a shaft rotational axis 24. The arbor is operatively attached, either directly or indirectly, to the motor shaft. The circular saw blade is operatively attached to the circular saw via the arbor. Circular saws 10 also include a safety brake 100 that defines a blade-receiving region 102, and circular saw blade 40 extends at least partially within the blade-receiving region.

During operation of circular saws 10, and as discussed in more detail herein, motor 20 may be utilized to provide a motive force for rotation of motor shaft 22 and attached circular saw blade 40 about shaft rotational axis 24. As perhaps best illustrated in FIGS. 3, 12, and 19, circular saw blade 40 may include teeth 48, and rotation of the circular saw blade about the shaft rotation axis may permit and/or facilitate cutting of a workpiece with, via, and/or utilizing the circular saw.

Figure 6:
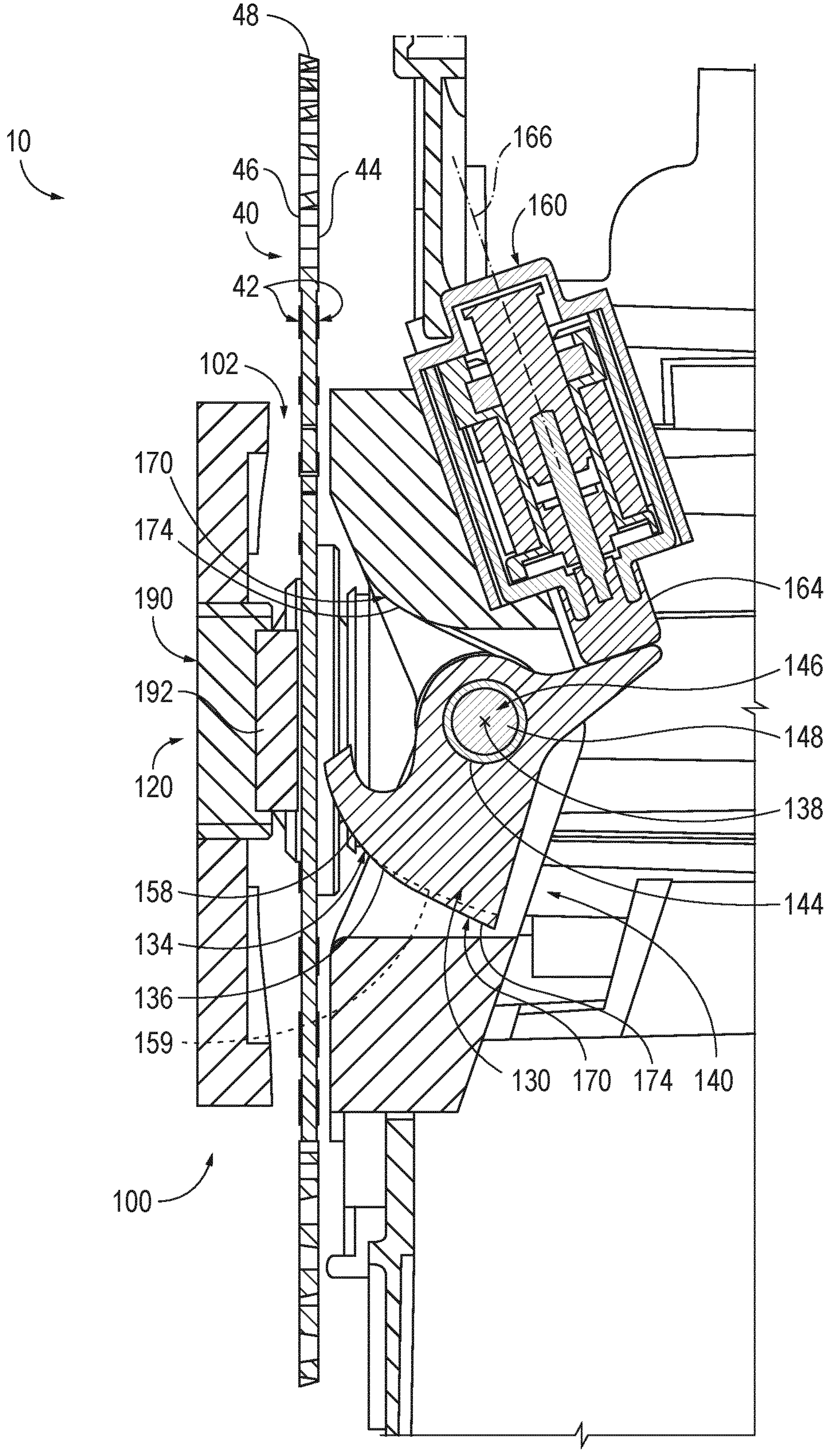
FIG. 6 is a less schematic cross-sectional view of a region of a circular saw that includes a safety brake, according to the present disclosure, illustrating the safety brake in a disengaged configuration.
Figure 8:
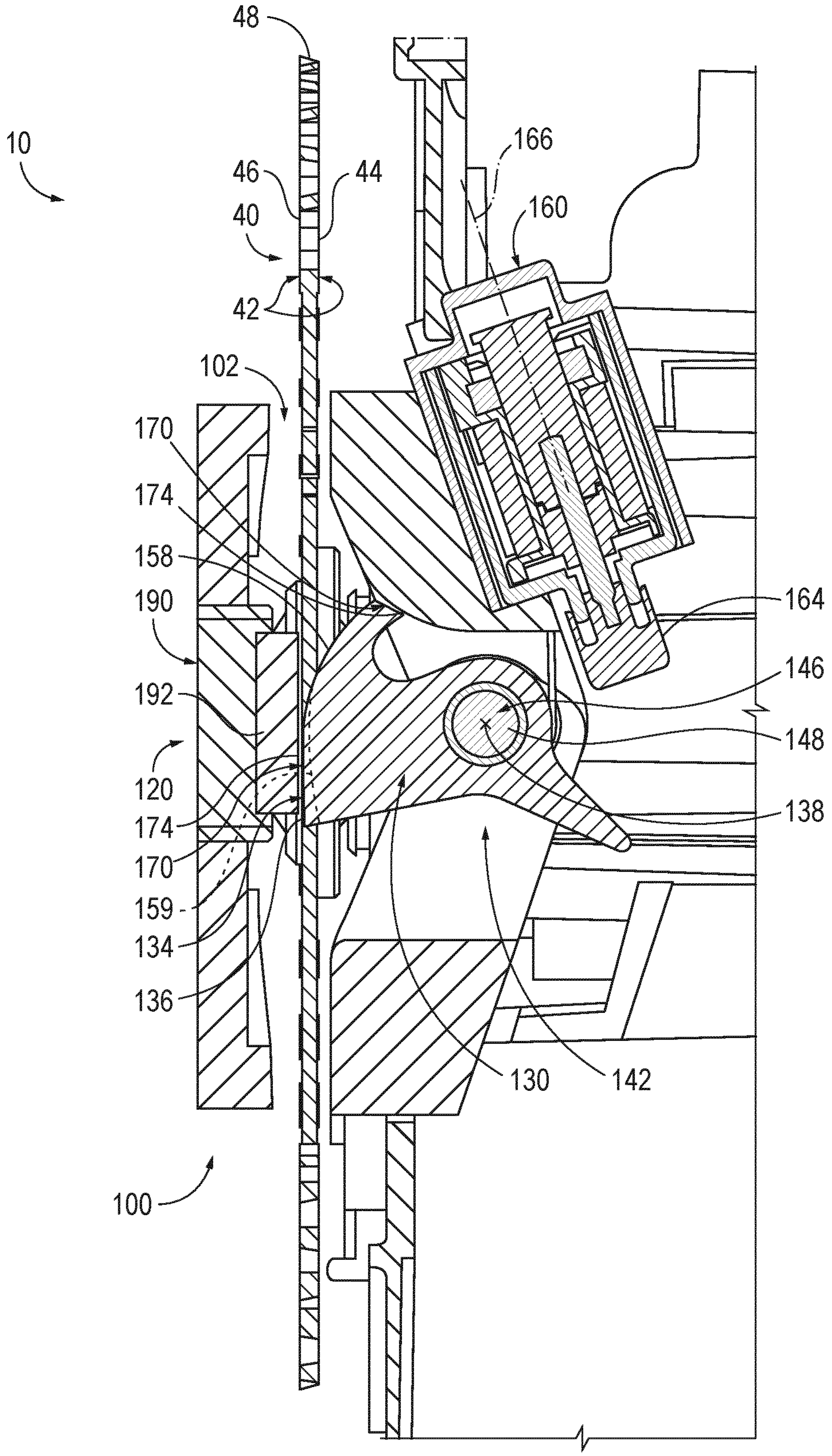
FIG. 8 is an illustration of the circular saw of FIGS. 6-7 illustrating the safety brake in an engaged configuration.

In contrast with conventional circular saws that do not include safety brake 100, circular saws 10 according to the present disclosure may include additional safety features that may protect people from harm, such as may be a result of contact between the people and the circular saw blade during rotation of the circular saw blade. More specifically, and as discussed in more detail herein, circular saws 10 are configured to detect situations in which there is a potential for injury and to immediately stop rotation of the circular saw blade responsive to such detection, thereby limiting and/or avoiding the injury. The rotation of the circular saw blade may be stopped by transitioning a brake assembly 120 of safety brake 100 from a disengaged configuration 140, as illustrated in FIGS. 1 and 6, to an engaged configuration 142, as illustrated in FIGS. 2 and 8. This transition from the disengaged configuration to the engaged configuration also is discussed in more detail herein.

Figure 4:
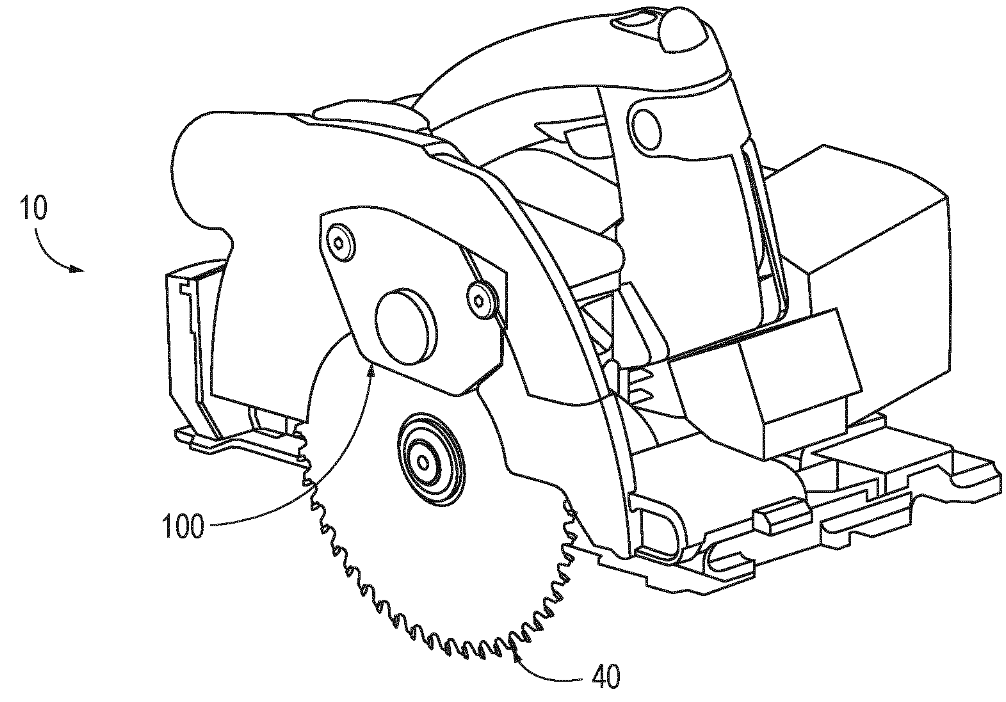
FIG. 4 is a less schematic profile view of a handheld circular saw that includes a safety brake, according to the present disclosure.
Figure 5:
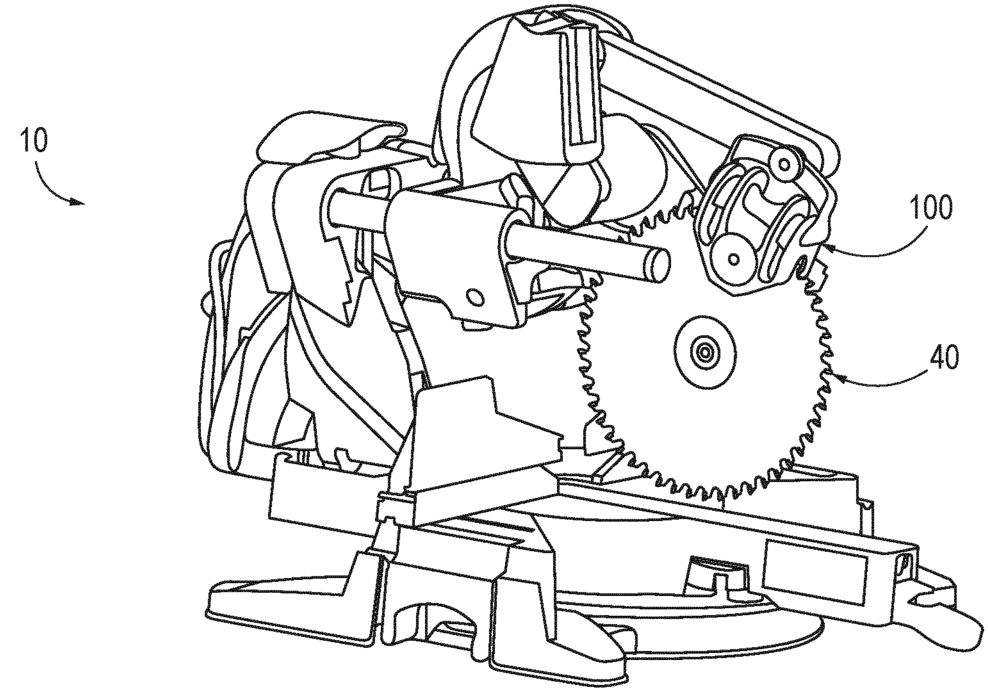
FIG. 5 is a less schematic profile view of a miter saw that includes a safety brake, according to the present disclosure.

In addition to the additional safety features that may be provided by the presence of safety brake 100, circular saws 10 also may include any suitable feature and/or features that are common to conventional circular saws and may include any suitable style and/or type of circular saw. As examples, circular saws 10 may include one or more of a handheld circular saw, a miter saw, a radial arm saw, a table saw, a chop saw, a plunge saw, an up cut saw, a panel saw, and/or a track saw. An example of a circular saw 10 in the form of a handheld circular saw that includes safety brake 100 is illustrated in FIG. 4. An example of a circular saw 10 in the form of a miter saw that includes safety brake 100 is illustrated in FIG. 5. Circular saws 10 may utilize any suitable power source, including corded power from an electrical outlet and/or one or more batteries, and may be referred to herein as corded circular saws 10 and/or as cordless circular saws 10.

Motor 20 may include any suitable structure that may provide the motive force for rotation of motor shaft 22, arbor 30, and/or circular saw blade 40. Examples of motor 20 include an electric motor, an AC electric motor, a DC electric motor, a brushless DC electric motor, a variable-speed motor, and/or a single-speed motor. Circular saw 10 may include any suitable power source, and corresponding power structures, for powering motor 20 and/or safety brake 100, examples of which include a power cord 80 and/or a battery 85, and it is within the scope of the present disclosure that the same or a different power source may be used for motor 20 and safety brake 100.

Arbor 30 may include any suitable structure that may be operatively attached to motor shaft 22 and/or that may, or that may be utilized to, operatively attach circular saw blade 40 to the circular saw 10 such that rotation of arbor 30 drives rotation of an operatively coupled circular saw blade 40. In general, arbor 30 is configured to permit and/or facilitate selective and repeated separation of the circular saw blade from a remainder of the circular saw, such as to permit and/or facilitate sharpening and/or replacement of the circular saw blade. An example of arbor 30 includes a threaded arbor 30.

As illustrated in dashed lines in FIGS. 1-2, circular saws 10 may include a gripping region 50. Gripping region 50, when present, may be configured to be gripped by the user of the circular saw. An example of gripping region 50 includes a handle.

As also illustrated in dashed lines in FIGS. 1-2, circular saws 10 may include a switch 55. Switch 55, when present, may be configured to be selectively actuated by the user of the circular saw and/or to selectively apply an electric current to motor 20, such as to power motor 20. Examples of switch 55 include an electrical switch, a normally open electrical switch, a momentary electrical switch, and/or a locking momentary electrical switch.

As also illustrated in dashed lines in FIGS. 1-2, circular saws 10 may include a blade guard 60. Blade guard 60, when present, may be configured to cover, to house, and/or to contain at least a region of circular saw blade 40, such as to prevent, or to decrease a potential for, contact between the user and the circular saw blade. Blade guard 60 may include a retractable region 62 that may be configured to fold, rotate, and/or otherwise retract when the circular saw is utilized to cut the workpiece. In some examples of circular saws 10, at least a region 64 of blade guard 60 may be defined by, and/or may contain, safety brake 100. Stated another way, safety brake 100 may function as at least region 64 of blade guard 60 by preventing contact between the user of the circular saw and a region of circular saw blade 40 that extends within blade-receiving region 102. As also illustrated in dashed lines in FIGS. 1-2, circular saw 10 may include a workpiece support 70 that may be configured to support a workpiece and/or to position the circular saw relative to the workpiece when the workpiece is cut by the circular saw.

Circular saws 10 may include a clutch 90, which also may be referred to herein as a safety clutch 90. Clutch 90, when present, may be configured to decrease a potential for damage to at least one component of the circular saw, such as motor 20, motor shaft 22, arbor 30, a gear train of the circular saw, and/or safety brake 100 when safety brake 100 transitions from its disengaged configuration 140 to its engaged configuration 142, such as to stop rotation of circular saw blade 40. This decrease in potential for damage may be accomplished by at least partially mechanically uncoupling circular saw blade 40 from motor shaft 22, thereby permitting rotation of motor shaft 22 independent from rotation of circular saw blade 40 and decreasing a rotational mass, or momentum, that must be stopped by safety brake 100 and/or permitting motor shaft 22 to cease rotation more slowly than circular saw blade 40. Clutch 90 may be incorporated into, may be defined within, and/or may be at least partially defined by arbor 30, by the gear train of the circular saw, and/or by a belt drive assembly of the circular saw.

Clutch 90 may operate in any suitable manner. As an example, clutch 90 may be configured to selectively permit rotation, or relative rotation, between the circular saw blade and the motor shaft when a torque between the circular saw blade and the motor shaft exceeds a threshold torque. As another example, clutch 90 may be configured to resist rotation, or relative rotation, between the circular saw blade and the motor shaft when the torque between the circular saw blade and the motor shaft is less than the threshold torque. Examples of clutch 90 include a torque-limiting clutch and a friction clutch.

As discussed in more detail herein, circular saws 10 and/or safety brakes 100 thereof include a sensor assembly 110, which may be configured to detect an actuation parameter. The actuation parameter may indicate that the actuator assembly should be utilized to actuate and/or to engage the safety brake. An example of the actuation parameter includes an undesired event parameter indicative of, or of the potential for, an undesired event to be avoided with and/or by the circular saw. Another example of the actuation parameter includes a kickback parameter indicative of, or of a potential for, kickback of the circular saw. Another example of the actuation parameter includes a movement parameter indicative of, or of a potential for, an undesired movement of the circular saw. Yet another example of the actuation parameter includes a proximity parameter indicative of a distance between an individual, such as a user of the circular saw, and the circular saw being less than a threshold distance. In various examples, and as discussed in more detail herein, the proximity parameter may be indicative of contact between the individual and the circular saw blade, of imminent contact between the individual and the circular saw blade, and/or of the distance between the individual and the circular saw blade being less than a small finite distance, examples of which are disclosed herein.

In order to increase a sensitivity of, a signal-to-noise ratio of, and/or a potential for a false reading of the sensor assembly, circular saws 10 may include a blade isolation structure 95. Blade isolation structure 95, when present, may be configured to electrically isolate circular saw blade 40 from at least one other component of the circular saw. Examples of the at least one other component of the circular saw include gripping region 50, switch 55, an exterior surface of the circular saw, and/or regions of the circular saw that may be touched by the user when the circular saw is utilized to cut the workpiece. Additionally or alternatively, blade isolation structure 95 may be configured to electrically isolate circular saw blade 40 from ground, or from earth ground.

Safety brakes 100 thus far have been described as being included in and/or as being a component of circular saws 10. It is within the scope of the present disclosure that safety brakes 100 may be incorporated into circular saws 10 in any suitable manner. As an example, circular saws 10 may be provided, from a manufacturer thereof, with safety brakes 100 already incorporated and/or included therein. As another example, safety brakes 100 may be configured to be included in, attached to, and/or retrofit to existing circular saws that did not necessarily include safety brakes 100 when originally produced and/or sold by the manufacturer. With this in mind, the following discussions of safety brakes 100 may refer to safety brakes 100 that are incorporated into circular saws 10 and/or of safety brakes 100 that may be produced and/or marketed as replacement safety brakes 100 for circular saws 10, and/or as safety brakes 100 that may be produced and/or marketed for retrofit installation on existing circular saws that did not include the safety brakes.

As collectively illustrated by FIGS. 1-9 and 12-17, and with reference to FIGS. 1-2, safety brakes 100 are configured to function as a safety brake for circular saw blades 40 of circular saws 10. Safety brakes 100 include sensor assembly 110, a brake assembly 120, and an actuator assembly 160. As discussed, sensor assembly 110 is configured to detect an actuation parameter, examples of which are disclosed herein. The actuation parameter indicates that the actuator assembly should be utilized to actuate and/or to engage the safety brake, such as to stop rotation of the circular saw blade. Stated another way, sensor assembly 110 may be configured to detect an unsafe condition, such as a potential for contact between the individual and the circular saw blade and/or actual contact between the individual and the circular saw blade. Sensor assembly 110 then may be configured to generate a trigger signal 112, which is illustrated in FIGS. 1-2, responsive to detection of the actuation parameter.

In some examples, sensor assembly 110 may be configured to generate the trigger signal responsive to, or immediately responsive to, contact, or the initiation of contact, between the individual and the circular saw blade. In some such examples, the sensor assembly may be referred to herein as generating the trigger signal responsive to the distance between the individual and the circular saw blade being negligible and/or zero. In some examples, sensor assembly 110 may be configured to generate the trigger signal responsive to the distance between the individual and the circular saw blade being a small, finite distance. Examples of such small, finite distances include distances of less than 5 millimeters (mm), less than 4 mm, less than 3 mm, less than 2 mm, less than 1 mm, or less than 0.5 mm. In some such examples, the small, finite distance is greater than zero.

Brake assembly 120 includes a brake cam 130. Brake assembly 120 and/or brake cam 130 thereof may be configured to transition between disengaged configuration 140, as illustrated in FIG. 1, and engaged configuration 142, as illustrated in FIG. 2. When in disengaged configuration 140, the brake cam is spaced apart from blade-receiving region 102 of safety brake 100 and/or does not contact blade 40 of circular saw 10, as illustrated in FIG. 1. In contrast, when in engaged configuration 142, the brake cam extends into blade-receiving region 102 and is configured to operatively engage with a planar side surface 42 of circular saw blade 40, such as to resist and/or stop rotation of the circular saw blade.

Figure 7:
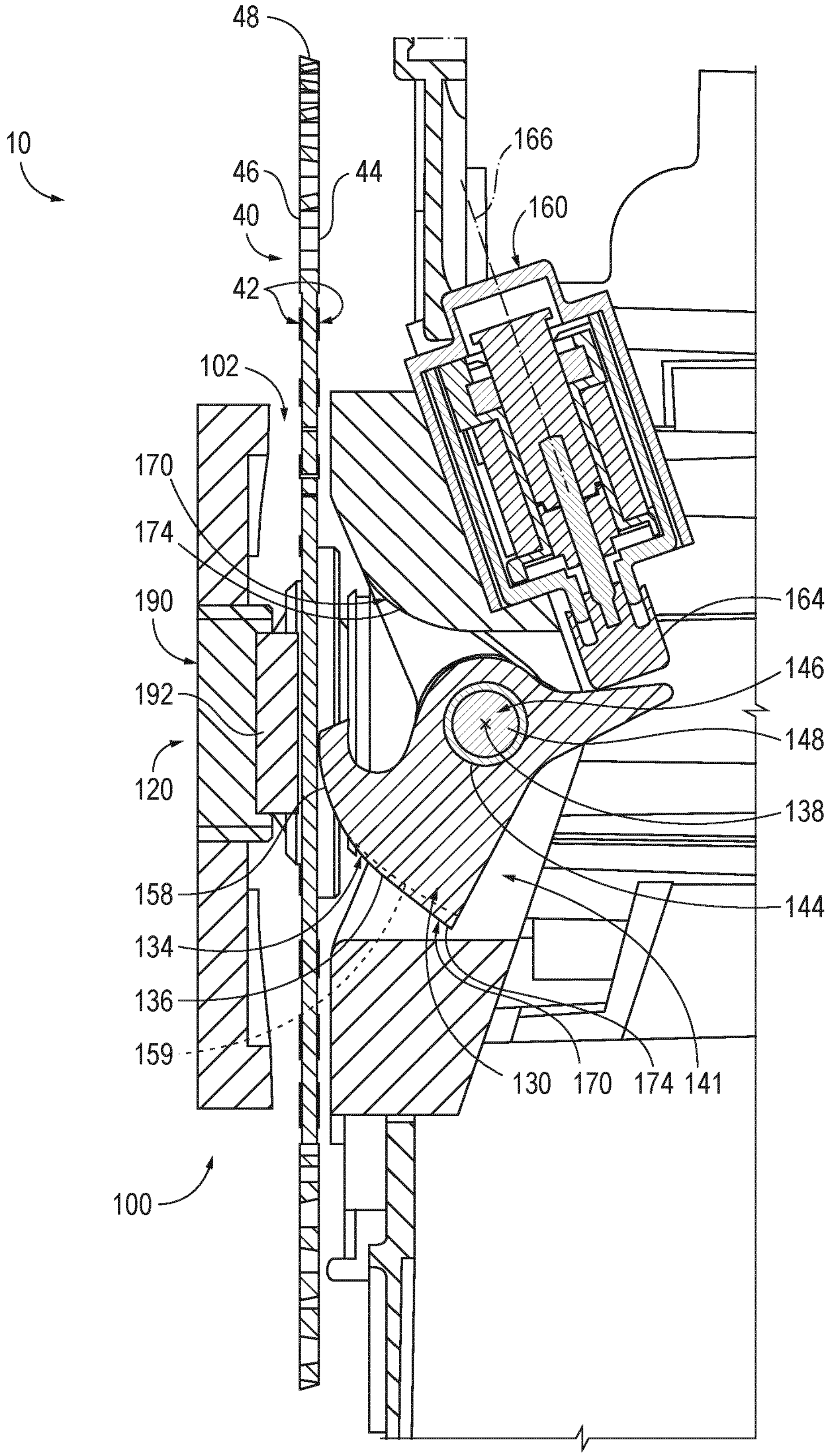
FIG. 7 is an illustration of the circular saw of FIG. 6 illustrating the safety brake in an intermediate configuration.

Actuator assembly 160 is configured to selectively transition brake assembly 120 and/or brake cam 130 thereof from the disengaged configuration to the engaged configuration. This selective transition may be performed responsive to, and/or as a result of, receipt of the trigger signal from the sensor assembly and/or by the actuator assembly. This selective transition is schematically illustrated in FIGS. 1-2 by the transition from the configuration of FIG. 1 to the configuration of FIG. 2. This selective transition also is illustrated less schematically in FIGS. 6-8, with FIG. 6 illustrating cam 130 spaced apart from circular saw blade 40 and in disengaged configuration 140, FIG. 7 illustrating actuator assembly 160 urging cam 130 into initial contact with circular saw blade 40 such that the cam is in an intermediate configuration 141, and FIG. 8 illustrating cam 130 in contact with circular saw blade 40 in engaged configuration 142 and resisting rotation of the circular saw blade.

Brake assembly 120 may include any suitable structure that includes brake cam 130 and that may be adapted, configured, designed, and/or constructed to selectively stop rotation of the circular saw blade and/or to selectively transition between disengaged configuration 140 and engaged configuration 142. In some examples, brake assembly 120 may include and/or be a non-destructive brake assembly 120, which may be configured to selectively stop rotation of the circular saw blade without damage to the circular saw blade and/or the brake assembly. In some examples, brake assembly 120 additionally or alternatively may include and/or be a resettable brake assembly, which may be configured to be selectively and repeatedly transitioned between the disengaged configuration and the engaged configuration, as discussed in more detail herein. In some examples, brake assembly 120 may include only one, or a single, brake cam 130; however, it also is within the scope of the present disclosure that brake assembly 120 may include more than one brake cam 130, such as a plurality of brake cams 130.

As discussed, brake assembly 120 and/or brake cam 130 thereof may be configured to selectively engage planar side surface 42 of circular saw blade 40. With this in mind, brake cam 130 may be referred to herein as being free from engagement with teeth 48 of the circular saw blade and/or as being spaced apart from the teeth of the circular saw blade. This may include being free from engagement with the teeth and/or being spaced apart from the teeth both when the brake cam is in disengaged configuration 140 and when the brake cam is in engaged configuration 142.

As illustrated by the transition from the configuration of FIG. 1 to the configuration of FIG. 2 and from the configuration of FIG. 6 to the configuration of FIG. 8, brake cam 130 may be configured to rotate about a cam axis of rotation 138 to selectively transition, or as the brake cam selectively transitions, from disengaged configuration 140 to engaged configuration 142 and/or between the disengaged and engaged configurations. In some examples, blade-receiving region 102 may include and/or be a planar, or an at least substantially planar, blade-receiving region 102. In such examples, cam axis of rotation 138 may be parallel, or at least substantially parallel, to the planar blade-receiving region. Stated another way, cam axis of rotation 138 may be parallel, or at least substantially parallel, to planar side surface 42 of circular saw blade 40. In some examples, cam axis of rotation 138 may be perpendicular, or at least substantially perpendicular, to an actuation axis 166 of actuator assembly 160.

Figure 9:
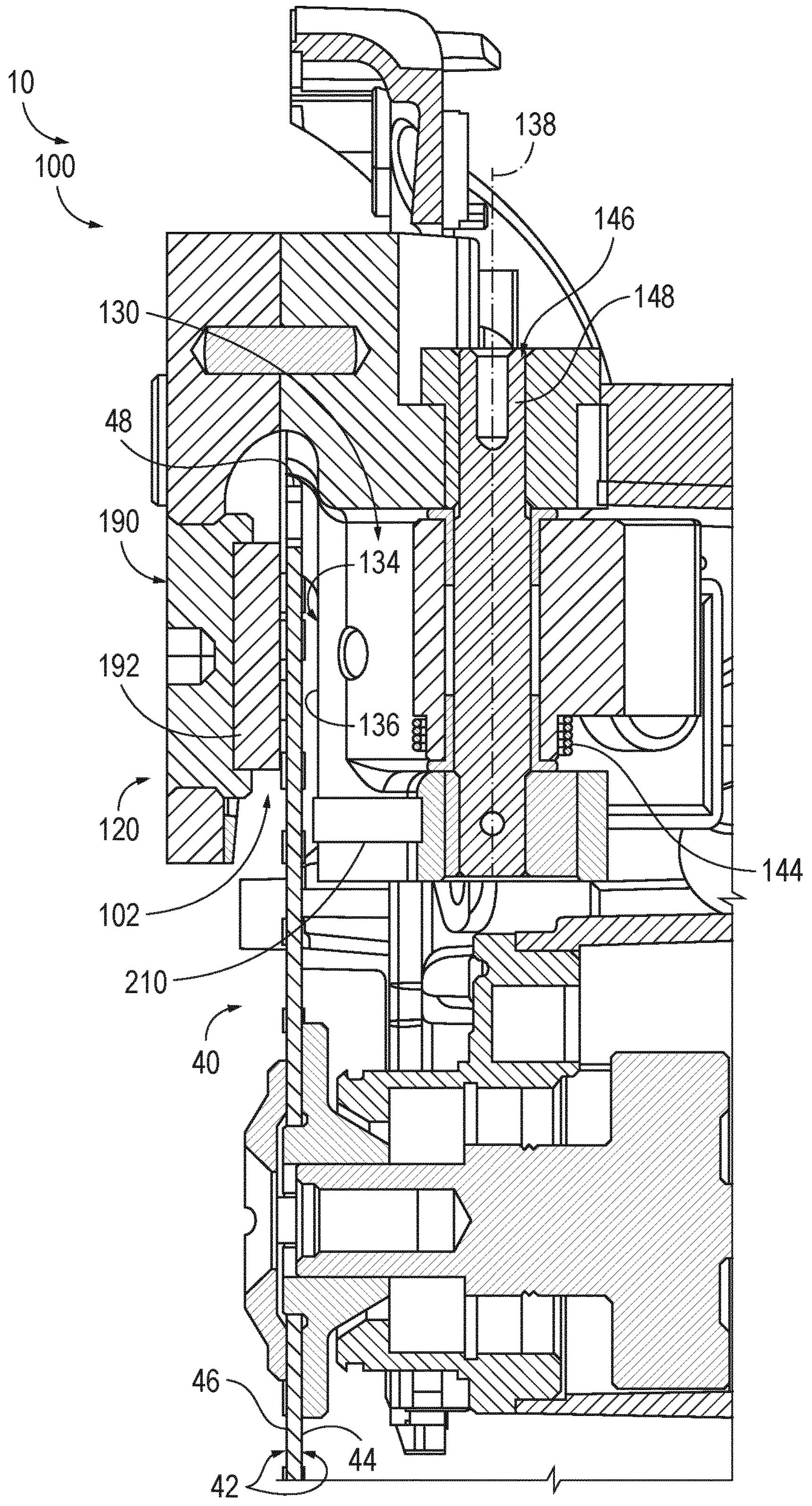
FIG. 9 is another less schematic cross-sectional view of a region of a circular saw that includes a safety brake, according to the present disclosure.

As illustrated in dashed lines in FIGS. 1-2 and in solid lines in FIG. 9, brake cam 130 may include a cam-biasing mechanism 144. Cam-biasing mechanism 144 may be configured to bias brake cam 130 toward and/or into disengaged configuration 140. Stated another way, cam-biasing mechanism 144 may cause brake cam 130 to remain in disengaged configuration 140 unless the brake cam is urged from the disengaged configuration and/or toward engaged configuration 142, such as by actuator assembly 160. Examples of cam-biasing mechanism 144 include a resilient cam-biasing mechanism, a cam-biasing spring, and/or a cam-biasing torsion spring.

Brake cam 130 may have and/or define a blade-engaging surface 134, which may be configured to operatively engage planar side surface 42 of circular saw blade 40, such as when the brake cam is in engaged configuration 142. In some examples, blade-engaging surface 134 may be shaped such that the brake cam presses progressively harder against the planar side surface of the circular saw blade as the brake cam rotates about cam axis of rotation 138 and/or as the brake cam transitions from disengaged configuration 140 to engaged configuration 142.

Figure 10:
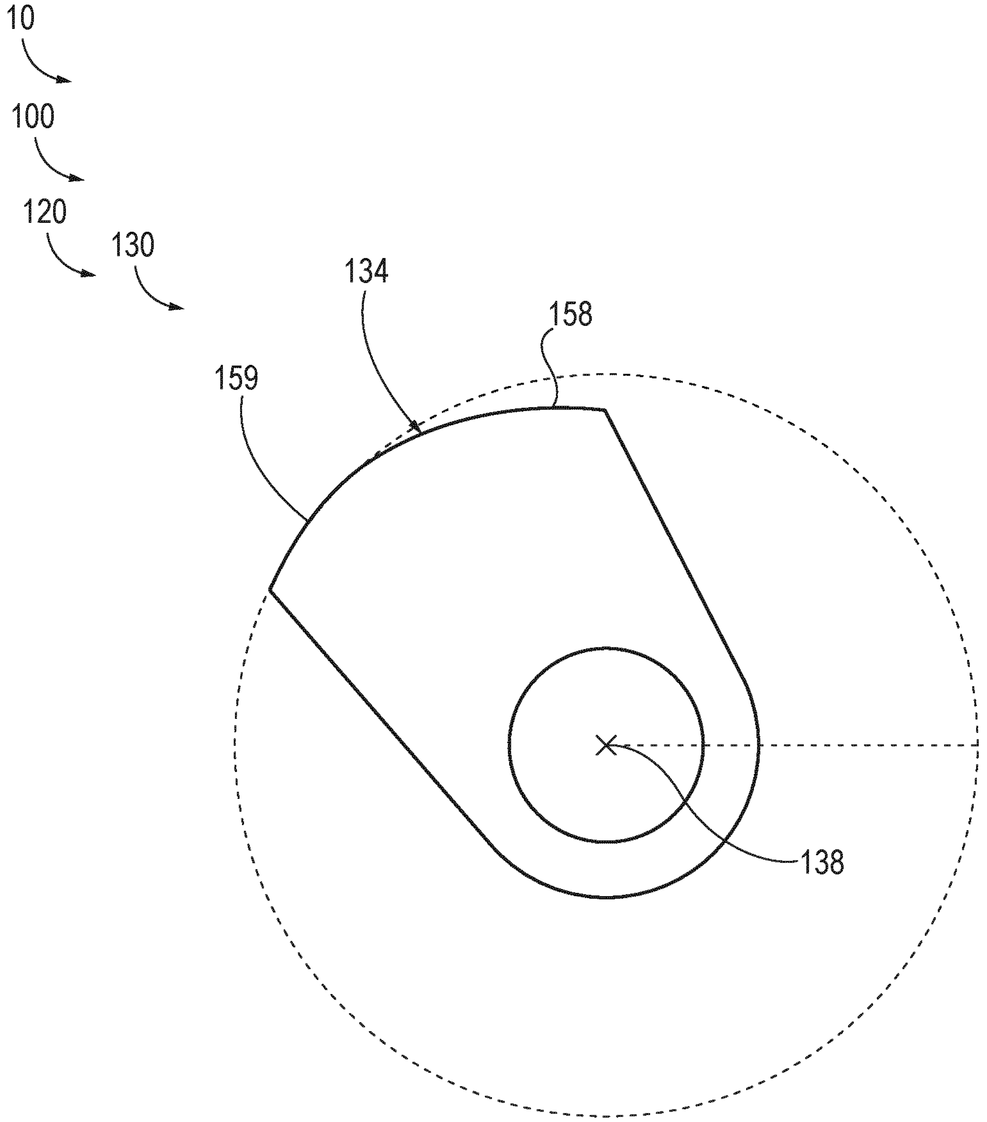
FIG. 10 is a less schematic illustration of a cam that includes a region of increasing radius and a region of constant radius and which may be utilized with safety brakes and/or circular saws, according to the present disclosure.

In some such examples, brake cam 130 may include a region of increasing radius 158 and a region of constant radius 159, examples of which are schematically illustrated in FIGS. 1-2, illustrated in dashed lines in FIGS. 6-8, and more explicitly illustrated in FIG. 10. As perhaps best illustrated in FIG. 10, a distance between cam axis of rotation 138 and blade-engaging surface 134 increases within region of increasing radius 158 until this distance matches the radius of region of constant radius 159, as indicated by the dashed circle.

In some such examples, the brake cam may be configured initially to engage the circular saw blade with the region of increasing radius and subsequently to engage the circular saw blade with the region of constant radius. Within the region of increasing radius, and as discussed, a distance between cam axis of rotation 138 and blade-engaging surface 134 may increase within a plane that is perpendicular to the cam axis of rotation, thereby causing the brake cam to press against the circular saw blade with a progressively harder force as the brake cam rotates in contact with the circular saw blade. Within the region of constant radius, and as also discussed, the distance between cam axis of rotation 138 and blade-engaging surface 134 may be constant within a plane that is perpendicular to the cam axis of rotation, thereby causing the brake cam to press with a constant, or at least substantially constant, force as the brake cam rotates further in contact with the saw blade.

In some examples, blade-engaging surface 134 may be shaped such that the brake cam automatically stops circular saw blade 40 and/or automatically transitions to the engaged configuration responsive to contact between the brake cam and the planar side surface of the circular saw blade.

Figure 11:
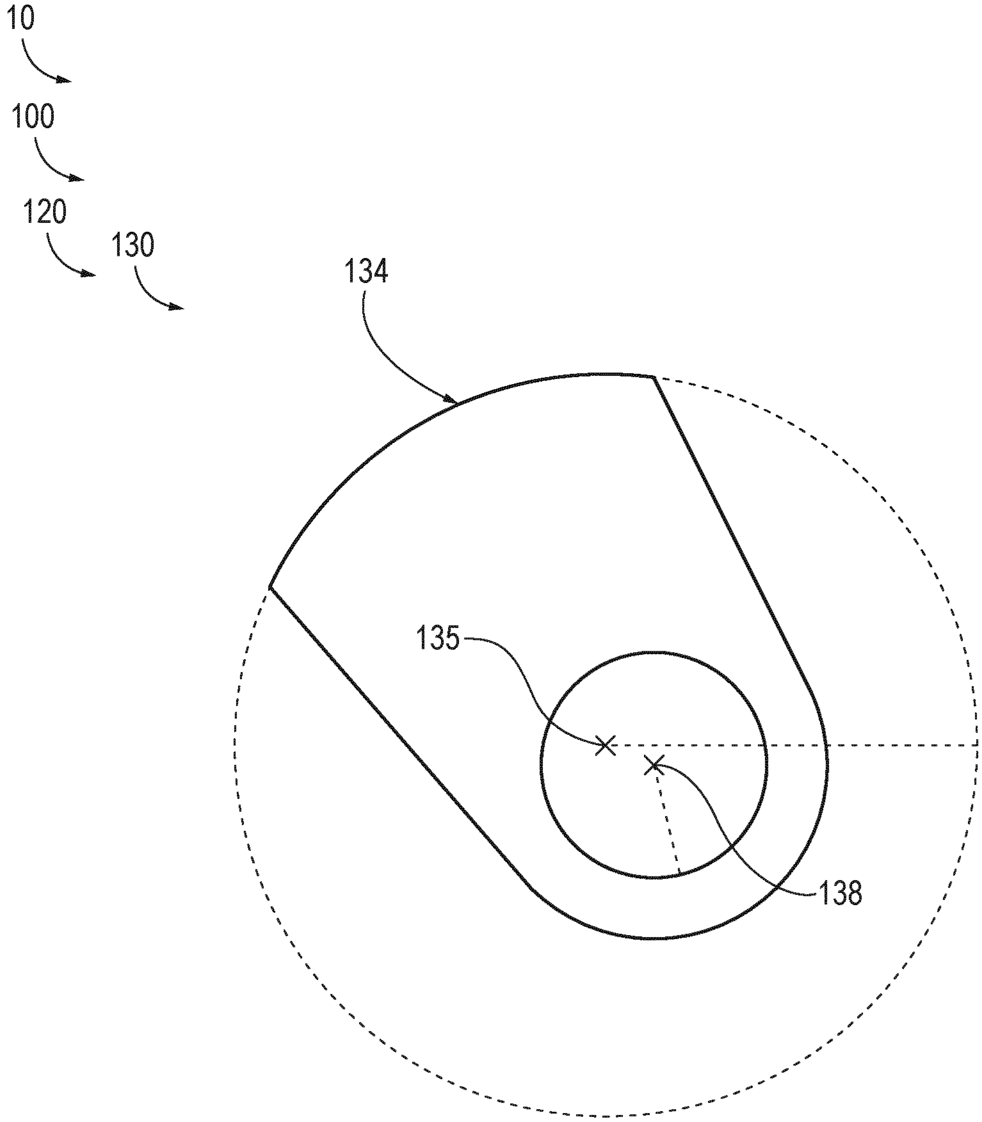
FIG. 11 is a less schematic illustration of a cam that includes an eccentric profile and which may be utilized with safety brakes and/or circular saws, according to the present disclosure.

In some examples, blade-engaging surface 134 may have and/or define an eccentric profile, or shape, relative to cam axis of rotation 138. As an example, and as illustrated in FIG. 11, blade-engaging surface 134 may have and/or define a constant radius of curvature, such as may be indicated by the dashed circle in FIG. 11. However, a center point 135 for this radius of curvature may be offset from cam axis of rotation 138 such that the blade-engaging surface presses harder against the circular saw blade as the cam rotates further into contact with the circular saw blade (such as in a clockwise direction in FIG. 11).

As another example, blade-engaging surface 134 may have and/or define a logarithmic spiral profile, or shape. The specific shape and/or profile of blade-engaging surface 134 may be designed and/or selected based upon a coefficient of friction between planar side surface 42 and brake cam 130, such as to provide a desired stopping force to blade 40 when the brake cam transitions to the engaged configuration. As another example, the friction between the brake cam and the planar side surface, once initiated, may urge the brake cam toward and/or to the engaged configuration.

Stated another way, safety brake 100, brake cam 130, and/or blade-engaging surface 134 may be configured such that frictional force between the circular saw blade and the brake cam, during rotation of the circular saw blade, urges the brake cam toward and/or into engaged configuration 142. Thus, and once actuator assembly 160 urges brake cam 130 into contact with circular saw blade 40, the frictional force may cause the brake cam to exert a greater and greater stopping force on the circular saw blade until rotation of the circular saw blade ceases. This configuration may be referred to herein as a self-reinforcing safety brake.

In some examples, brake cam 130 may include a cam friction material 136, which may define blade-engaging surface 134 and/or which may be selected to increase the coefficient of friction between the blade-engaging surface and the circular saw blade. Examples of cam friction material 136 include a diamond coating, an abrasive material, an abrasive grit coating, a ceramic material, a sintered material, and/or a metal alloy.

In some examples, blade-engaging surface 134 may be integral to and/or defined by brake cam 130. In other examples, the blade-engaging surface may be applied to the brake cam and/or may coat the brake cam. In other examples, brake cam 130 may include a blade-engaging surface insert 132, as illustrated in FIGS. 1-2. Blade-engaging surface insert 132, when present, may be operatively attached to a remainder of the brake cam, may form and/or define blade-engaging surface 134, and/or may include and/or may be defined by cam friction material 136. In some such examples, brake cam 130 and/or blade-engaging surface insert 132 may be configured to be repaired and/or replaced, such as subsequent to greater than a threshold amount of wear and/or subsequent to transitioning the brake cam from the disengaged configuration to the engaged configuration greater than a threshold number of times. Additionally or alternatively, brake cam 130 may be configured to be repaired and/or replaced.

Safety brake 100, brake assembly 120, and/or brake cam 130 may be configured such that upon being transitioned from disengaged configuration 140 to engaged configuration 142, the brake cam remains in the engaged configuration. Such safety brakes 100, brake assemblies 120, and/or brake cams 130 may be referred to herein as and/or may be self-locking safety brakes 100, self-locking brake assemblies 120, and/or self-locking brake cams 130, respectively. As an example, safety brakes 100, brake assemblies 120, and/or brake cams 130 may be configured to remain in the engaged configuration until the brake cam is released from the engaged configuration, such as by the user of the circular saw. Stated another way, and as discussed in more detail herein, actuation of a reset mechanism 146 by the user of the circular saw may be required for brake assembly 120 to transition from the engaged configuration to the disengaged configuration. This further may increase safety of circular saws 10 that include safety brakes 100, such as by forcing the user to acknowledge and/or correct condition(s) that caused the brake assembly to transition to the engaged configuration prior to subsequent operation of the circular saw.

Safety brake 100, brake assembly 120, and/or brake cam 130 may utilize any suitable mechanism to remain in and/or within the engaged configuration. As an example, brake cam 130 may be shaped to remain in the engaged configuration. As a more specific example, brake cam 130 may include a lock region and/or a flattened region that retains the brake cam in the engaged configuration. As another example, operative engagement and/or a force between the circular saw blade and the brake cam may retain the brake cam in the engaged configuration.

Brake assembly 120 may include a stop 170, as illustrated in FIGS. 1-2. Stop 170, when present, may be configured to limit rotation of brake cam 130, such as about cam axis of rotation 138. In some examples, stop 170 may include a disengaged configuration stop 172, which may be configured to limit rotation of the brake cam away from blade-receiving region 102 while the brake cam is in the disengaged configuration. In some examples, stop 170 may include an engaged configuration stop 174, which may be configured to limit rotation of the brake cam toward and/or into blade-receiving region 102 while the brake cam is in the engaged configuration, as illustrated in FIG. 8.

It is within the scope of the present disclosure that stop 170 may be defined in any suitable manner. As an example, stop 170 may be at least partially defined by brake cam 130, such as by a shape and/or profile of the brake cam that limits rotation thereof as illustrated, for example, by the flat region of cam 130 that it is presented in solid lines and defines engaged configuration stop 174 in FIGS. 6-8. As another example, stop 170 may be configured to operatively engage with the brake cam to limit rotation of the brake cam, such as when an actuator arm 164 of actuator assembly 160 engages the brake cam, as perhaps best illustrated in FIG. 6.

As illustrated in FIGS. 1-3, 10, and 16-17, brake assembly 120 may include a housing 180, which also may be referred to herein as a caliper 180. Housing 180 may be configured to operatively support brake cam 130 and/or actuator assembly 160. Additionally or alternatively, housing 180 may at least partially surround blade-receiving region 102. Housing 180 may be formed from a mechanically stiff material, such as a metal or plastic. Such a configuration may decrease deflection when brake cam 130 transitions to the engaged configuration and/or may decrease a time needed for the brake cam to stop rotation of the circular saw blade upon transitioning from the disengaged configuration to the engaged configuration.

As illustrated in FIGS. 1-3 and 18, housing 180 may include a split housing that is configured to be disassembled into two or more separate and/or distinct housing regions 182. In such a configuration, and as discussed in more detail herein, separation of housing regions 182 may permit brake assembly 120 to be reset and/or to transition from the engaged configuration to the disengaged configuration.

As illustrated in dashed lines in FIGS. 1-2 and in solid lines in FIGS. 6-9, safety brake 100 and/or brake assembly 120 thereof may, in addition to brake cam 130, include a brake pad 190. Brake pad 190, when present, may include a pad friction material 192, examples of which are disclosed herein with reference to cam friction material 136. Brake pad 190 may be positioned, within brake assembly 120 and/or relative to brake cam 130, such that pad friction material 192 faces toward brake cam 130, faces toward blade-receiving region 102, and/or faces toward circular saw blade 40. Additionally or alternatively, brake pad 190 may be positioned such that blade-receiving region 102 extends at least partially between the brake pad and the brake cam. Brake assembly 120 may be configured such that, when the brake assembly is in the engaged configuration, at least a region of circular saw blade 40 is compressed between brake pad 190 and brake cam 130.

Figure 17:
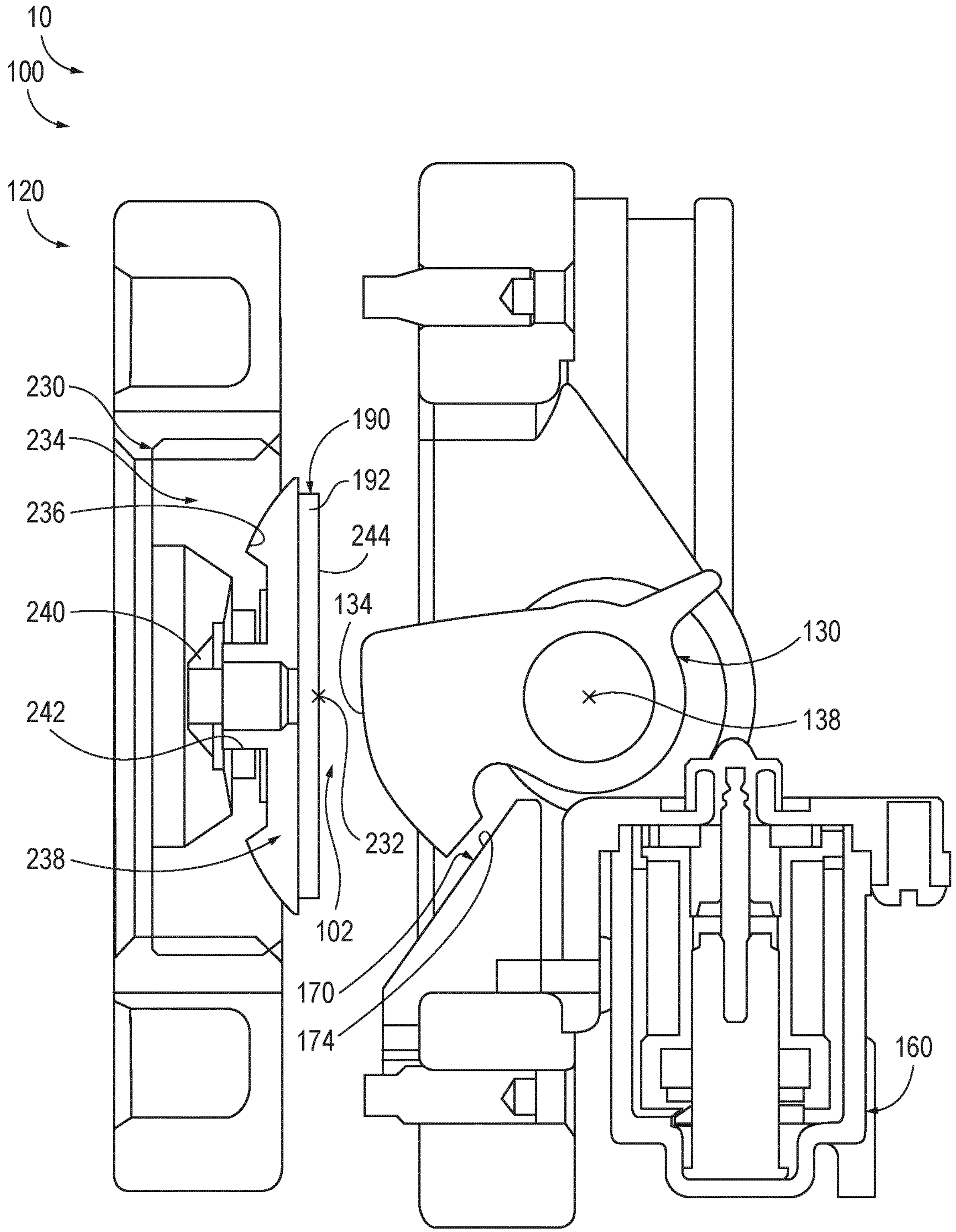
FIG. 17 is a schematic illustration of a brake assembly that includes a pivotal pad mount, according to the present disclosure.

In some examples, brake pad 190 may include a pivotal pad mount 230, as illustrated in FIGS. 1-2 and 17. Pivotal pad mount 230, when present, may be configured to permit limited rotation of brake pad 190, such as about a pivot point 232. Additionally or alternatively, pivotal pad mount 230 may be configured to permit limited rotation of brake pad 190 about at least one pivot axis or even about a plurality of pivot axes. Such a configuration may permit a friction surface 244 of brake pad 190 to align with, or rest flat against, the circular saw blade despite misalignment between brake assembly 120 and/or the circular saw blade and/or despite deflection of the brake assembly and/or the circular saw blade. This may permit and/or facilitate even load and/or force distribution between circular saw blade 200 and brake pad 190 and/or friction surface 244 thereof. This even load and/or force distribution between the brake pad and the saw blade also may permit and/or facilitate even load and/or force distribution between the brake cam and the circular saw blade. Such even load and/or force distributions may decrease a magnitude of point forces on various components of the circular saw, which may permit lighter components to be utilized, may decrease wear of the components, and/or may increase a service life of the components. Friction surface 244 may include and/or be a planar, or an at least substantially planar, friction surface 244, which may be configured for at least partial, or even complete, face-to-face contact with the planar side surface of the circular saw blade.

Figure 12:
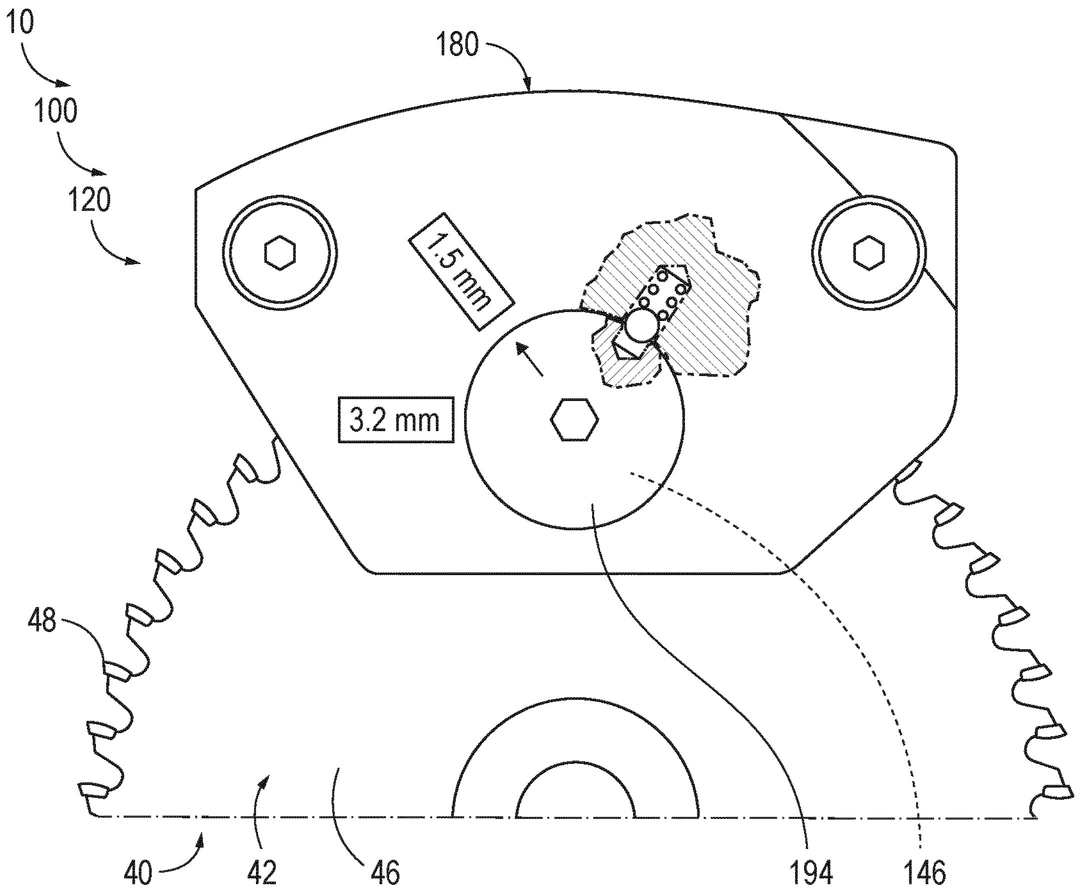
FIG. 12 is a less schematic side view of a safety brake and circular saw blade, according to the present disclosure, illustrating an adjustment mechanism and a reset mechanism, according to the present disclosure.
Figure 13:
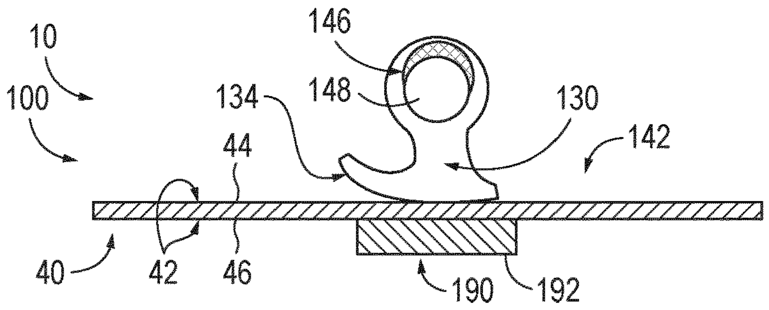
FIG. 13 is a less schematic illustration of a reset mechanism, according to the present disclosure.
Figure 14:
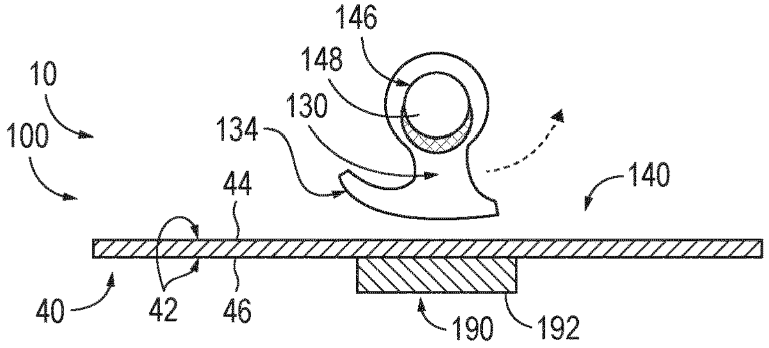
FIG. 14 is another view of the reset mechanism of FIG. 13.
Figure 15:
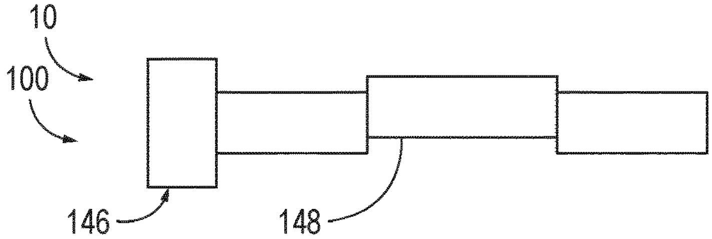
FIG. 15 is another view of the reset mechanism of FIGS. 13-14.

As illustrated in dashed lines in FIGS. 1-2 and in solid lines in FIG. 12, brake assembly 120 may include an adjustment mechanism 194. Adjustment mechanism 194, when present, may be configured to selectively adjust, or to be utilized to selectively adjust, a distance 196, which is illustrated in FIG. 1, between the brake pad and the brake cam. Such adjustment may permit and/or facilitate utilization of circular saw blades 40 having different thicknesses within circular saw 10 and/or may permit safety brake 100 to define a desired spacing between brake pad 190 and the circular saw blade, regardless of differences in thickness and/or other properties of the circular saw blade. As an example, and as illustrated in FIG. 12, adjustment mechanism 194 may include detents for predefined and/or specific circular saw blade thicknesses, such as 1.5 mm and 3.2 mm in the illustrated example. An example of adjustment mechanism 194 includes a threaded fastener configured to adjust the distance between the brake pad and the brake cam.

Circular saw blade 40 may include a plurality of planar side surfaces 42, including a first planar side surface 44 and a second planar side surface 46, which may be opposed to the first planar side surface. In such a configuration, brake cam 130 may be configured to operatively engage first planar side surface 44, and brake pad 190 and/or pad friction material 192 thereof may be configured to operatively engage the second planar side surface of the circular saw blade.

Figure 3:
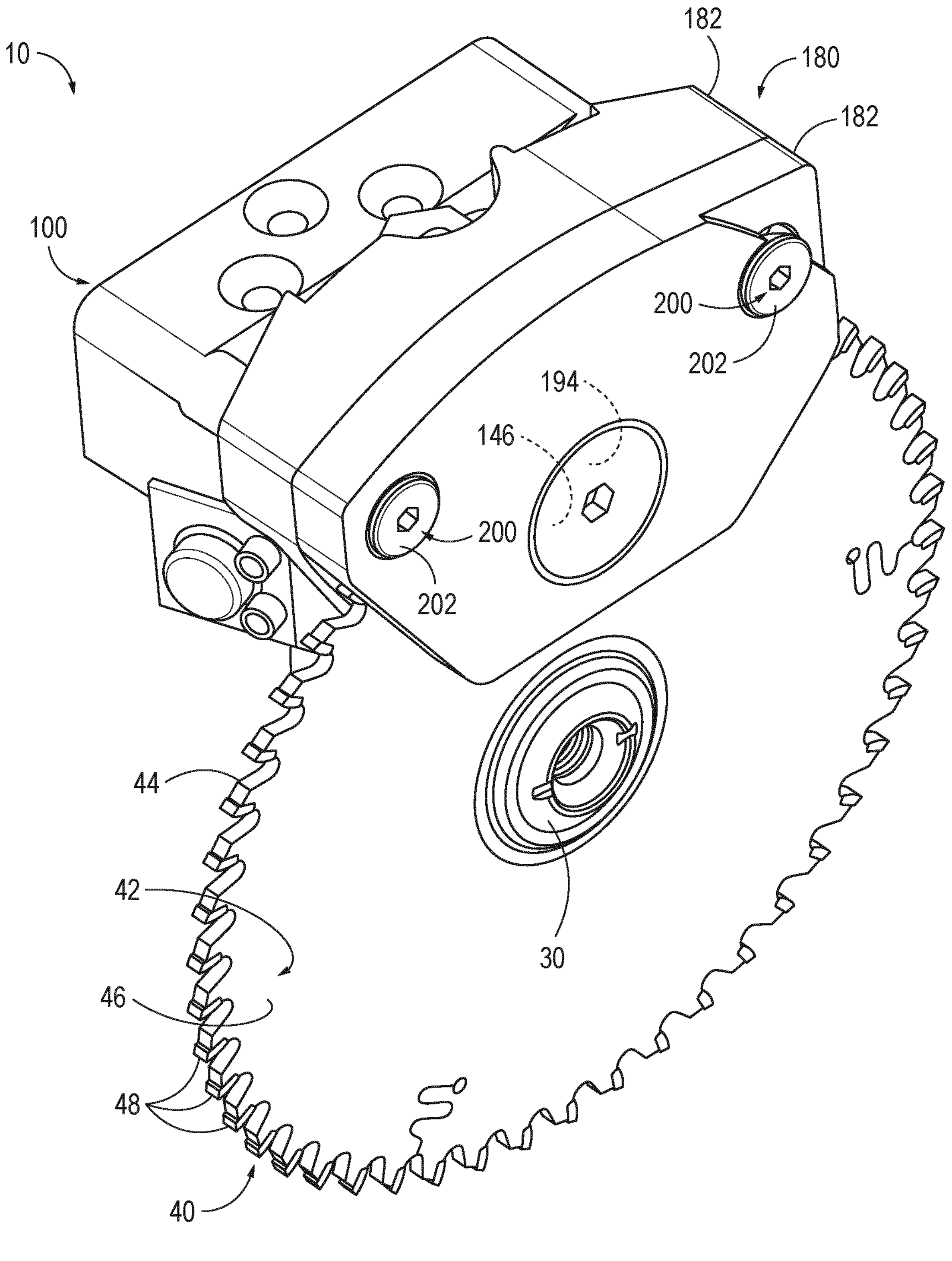
FIG. 3 is a less schematic profile view of an example of a safety brake and circular saw blade, according to the present disclosure.

As perhaps best illustrated in FIGS. 1-3, safety brake 100 may include an attachment mechanism 200, which may be configured to operatively attach at least a portion of the safety brake, such as brake cam 130, actuator assembly 160, housing 180, and/or brake pad 190, to circular saw 10. In some examples, attachment mechanism 200 may maintain a fixed, or at least substantially fixed, relative orientation between blade-receiving region 102 and a remainder of the circular saw.

In some examples, attachment mechanism 200 may include and/or be a floating attachment mechanism configured to permit blade-receiving region 102 to operatively translate relative to the remainder of the circular saw, such as along a float axis 204 that may be perpendicular, or at least substantially perpendicular, to planar side surface 42 of the circular saw blade. Such a configuration may permit brake pad 190 to remain fixed, or at least substantially fixed, relative to housing 180 during actuation of brake assembly 120 from the disengaged configuration to the engaged configuration while permitting both brake pad 190 and brake cam 130 to engage circular saw blade 40 when in the engaged configuration. An example of floating attachment mechanism 200 includes an attachment pin 202, or a plurality of attachment pins 202. In such a configuration, the attachment mechanism may be configured to permit blade-receiving region 102 to operatively translate relative to a remainder of the circular saw along a longitudinal axis of the attachment pin, such as float axis 204.

In some such examples, and as illustrated in FIGS. 1-2, the floating attachment mechanism may include a floating attachment mechanism lock 206. Floating attachment mechanism lock 206, when present, may be selectively configured to permit and selectively configured to restrict operative translation of blade-receiving region 102 relative to the remainder of the circular saw. As an example, floating attachment mechanism lock 206 may be configured to permit operative translation of blade-receiving region 102 relative to the remainder of the circular saw to facilitate operative alignment between the blade-receiving region and the circular saw blade. Subsequently, floating attachment mechanism lock 206 may be configured to restrict the operative translation, such as during operative use of the circular saw to cut the workpiece.

Actuator assembly 160 may include any suitable structure that may be adapted, configured, designed, and/or constructed to selectively transition the brake cam from the disengaged configuration to the engaged configuration responsive to receipt of the trigger signal from the sensor assembly. Examples of actuator assembly 160 include an electric actuator assembly, a pneumatic actuator assembly, a hydraulic actuator assembly, and/or an explosive actuator assembly. Additional examples of actuator assembly 160 include a solenoid, a pneumatic cylinder, a hydraulic cylinder, an explosive charge, a shape memory alloy actuator assembly, a magnetoresistive actuator assembly, a piezoelectric actuator assembly, a thermic actuator assembly, a permanent magnet actuator assembly, and/or an electroactive polymer actuator assembly. Further examples of actuator assembly 160 include an actuator assembly biasing mechanism 168, such as a resilient biasing mechanism, a spring, a mechanical spring, a pre-loaded spring, and/or a pre-tensioned spring.

In a specific example, actuator assembly 160 may include both the actuator biasing mechanism and a release mechanism 169, which may be configured to release the actuator assembly biasing mechanism, thereby permitting the resilient biasing mechanism to urge the brake cam from the disengaged configuration to the engaged configuration, responsive to receipt of the trigger signal. Stated another way, the release mechanism may be configured to selectively permit the actuator assembly biasing mechanism to transition the brake cam from the disengaged configuration to the engaged configuration. Such selective actuation may be responsive to receipt of the trigger signal by the release mechanism.

Actuator assembly 160 may include a power source 162, as illustrated in FIGS. 1-2. Power source 162 may be configured to power the actuator assembly. In some examples, power source 162 may be configured to power the actuator assembly even if a primary power supply of the circular saw is unavailable to power motor 20. When actuator assembly 160 includes the electric actuator assembly, power source 162 may include and/or be an electric power source, such as a battery and/or a capacitor.

Actuator assembly 160 may include actuator arm 164, as illustrated in FIGS. 2 and 6-8. Actuator arm 164 may be configured to selectively extend from the actuator assembly and/or to selectively transition the brake cam from the disengaged configuration to the engaged configuration. Actuator assembly 160 additionally or alternatively may include an electromagnet, which may be configured to selectively transition the brake cam from the disengaged configuration to the engaged configuration. In a specific example, actuator assembly 160 includes an actuator solenoid that includes actuator arm 164 in the form of a solenoid armature. In this example, the solenoid armature may be configured to operatively engage the brake cam to transition the brake cam from the disengaged configuration to the engaged configuration. As illustrated in FIGS. 2 and 6-8, actuator arm 164, in the form of the solenoid armature, may be in direct physical contact with cam 130 as the cam transitions from the disengaged configuration to the engaged configuration. Stated another way, brake assembly 120 may be free from an intervening mechanical and/or pivotal linkage that interconnects the actuator arm and the brake cam. Such a construction may decrease an overall mass of moving parts within the brake assembly and/or may increase a speed at which the brake assembly transitions from the disengaged configuration to the engaged configuration.

Sensor assembly 110 may include any suitable structure that may be adapted, configured, designed, and/or constructed to detect the actuation parameter and/or to generate the trigger signal. An example of sensor assembly 110 includes a capacitive sensor assembly configured to detect the actuation parameter. Additional examples of sensor assembly 110 and/or of other components that may be incorporated into and/or utilized with circular saws 10 and/or safety brakes 100, according to the present disclosure, are disclosed in U.S. Pat. Nos. 7,536,238, 7,971,613, and 9,724,840 and also in International Patent Application Publication No. WO 2017/0210091, the complete disclosures of which are hereby incorporated by reference.

As illustrated in dashed lines in FIGS. 1-2 and in solid lines in FIG. 9, safety brake 100 may include a deflection-mitigating structure 210, which may at least partially define blade-receiving region 102. Deflection-mitigating structure 210, when present, may be configured to resist deflection of saw blade 40 into contact with brake cam 130 when the circular saw is utilized to cut a workpiece and the brake cam is in the disengaged configuration. Stated another way, and in some examples, the workpiece may cause the circular saw blade to deflect toward the brake cam. As discussed herein, brake cam 130 may be configured such that, upon contact with the rotating circular saw blade, the brake cam automatically transitions to the engaged configuration, such as via frictional forces between the circular saw blade and the brake cam. Such a transition during normal cutting operations of the circular saw, or without detection of the actuation parameter, may be undesirable. As such, deflection-mitigating structure 210 may be utilized to decrease a potential for this undesirable contact between the circular saw blade and the brake cam.

Deflection-mitigating structure 210 may resist contact between the circular saw blade and the brake cam in any suitable manner. As an example, deflection-mitigating structure 210 may include a deflection-mitigating surface 212, as illustrated in FIGS. 1-2, which may be configured to operatively contact circular saw blade 40 when the circular saw blade is deflected toward the brake cam. More specifically, deflection-mitigating surface 212 may be positioned to be contacted by circular saw blade 40 prior to the circular saw blade being deflected into contact with the brake cam. As a result, deflection-mitigating surface 212 may prevent the circular saw blade from being deflected into contact with the brake cam.

As discussed in more detail herein with reference to blade isolation structure 95, it may be desirable to electrically insulate circular saw blade 40 from one or more other components of circular saw 10. With this in mind, at least deflection-mitigating surface 212 of deflection-mitigating structure 210 may be electrically isolated from a remainder of the circular saw.

In some examples, deflection-mitigating structure 210 may include an electrically isolating structure 214, which also may be referred to herein as an electrically insulating spacer 214, that electrically isolates the circular saw blade from the one or more other components of the circular saw during contact between the deflection-mitigating structure and the circular saw blade. An example of the electrically isolating structure includes an electrical insulator.

In some examples, deflection-mitigating structure 210 may be defined by an electrically insulating material that defines deflection-mitigating surface 212. As a specific example, deflection-mitigating structure 210 may be at least partially, or even completely, defined by a ceramic material.

As discussed, subsequent to a transition to engaged configuration 142, safety brakes 100 may be configured to remain in the engaged configuration at least until the user of the circular saw transitions the circular saw to the disengaged configuration. With this in mind, safety brakes 100 may include a reset mechanism 146, which may be configured to, or to permit the user of the circular saw to, selectively transition the brake cam from the engaged configuration to the disengaged configuration, such as to permit continued utilization of the circular saw to cut the workpiece.

An example of reset mechanism 146 includes an eccentric structure 148, such as an eccentric shaft, eccentric bushings, and/or eccentric bearings. This is illustrated in FIGS. 6-9 and 13-15. As perhaps best illustrated in FIGS. 13-15, eccentric structure 148 may have an off-center lobe and/or may be configured to be rotated to move brake cam 130 away from circular saw blade 40, for example, as illustrated by the transition from engaged configuration 142 illustrated in FIG. 13 to disengaged configuration 140 illustrated in FIG. 14. Subsequent to being moved away from the circular saw blade, brake cam 130 may automatically be urged to rotate to the disengaged configuration, as illustrated by the dashed arrow in FIG. 14, by the cam-biasing mechanism. In some examples, and as illustrated in FIG. 1, safety brakes 100 may include a pretensioned lever 156, which may be configured to rotate, or to selectively rotate, the eccentric structure.

Another example of reset mechanism 146 includes adjustment mechanism 194, which may be utilized to move the brake pad away from the circular saw blade, thereby permitting the brake cam to return to the disengaged configuration. In such an example, a tool, such as a hex wrench, may be utilized to loosen the adjustment mechanism, thereby moving brake pad 190 away from the circular saw blade and permitting the brake cam to return to the disengaged configuration.

Figure 16:
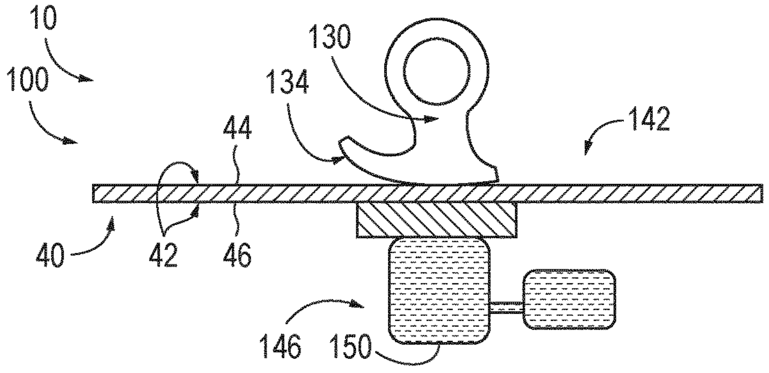
FIG. 16 is a schematic illustration of an example of another reset mechanism according to the present disclosure.
Figure 18:
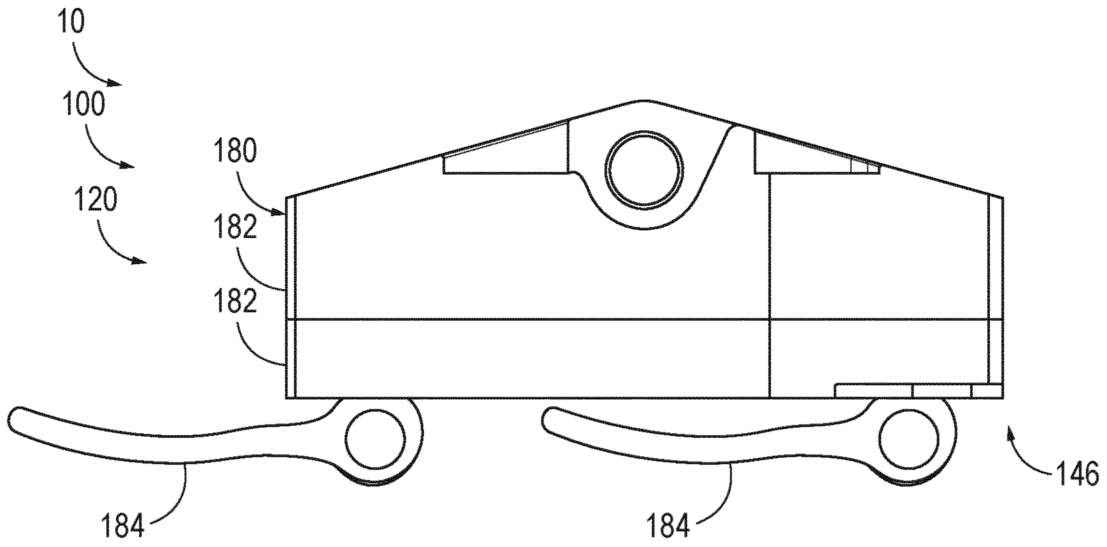
FIG. 18 is a schematic illustration of an example of another reset mechanism according to the present disclosure.

Yet another example of reset mechanism 146 includes housing 180 with distinct housing regions 182 that may be separated, such as via a fastener 184, as illustrated in FIG. 18, thereby permitting the brake cam to return to the disengaged configuration. Another example of reset mechanism 146 includes a pressure-actuated reset mechanism 150, as illustrated in FIG. 16. Pressure-based reset mechanism 150 may be configured to release and/or to decrease a pressure applied to brake pad 190 and/or to brake cam 130 to permit the brake cam and/or the brake pad to translate away from blade-receiving region 102 and/or out of contact with the circular saw blade, thereby permitting the brake cam to return to the disengaged configuration via action of cam-biasing mechanism 144. As an example, pressure-actuated reset mechanism 150 may include a hydraulic cylinder that is depressurized to move brake pad 190 and/or brake cam 130 away from and/or out of contact with the circular saw blade, thereby permitting the brake cam to return to the disengaged configuration.

Figure 19:
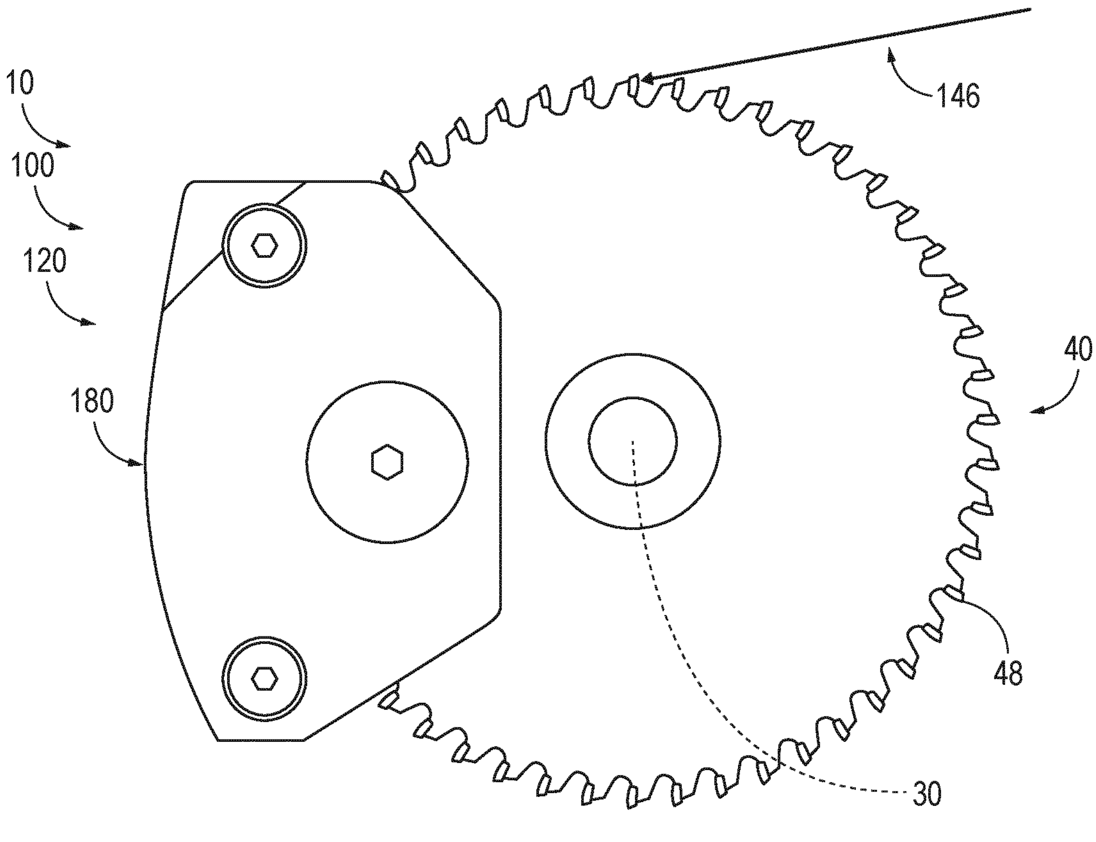
FIG. 19 is a schematic illustration of an example of another reset mechanism according to the present disclosure.

Yet another example of reset mechanism 146 may include rotation of circular saw blade 40 in a direction that is opposed to the direction in which the circular saw blade rotates when powered by motor 20. This is illustrated in FIG. 19 and may be accomplished by pressing the circular saw blade against the workpiece. Additionally or alternatively, a tool, such as a hex wrench, may be utilized to rotate arbor 30 in the direction that is opposed to the direction in which the circular saw blade rotates when powered by motor 20. In either instance, this rotation may cause brake cam 130 to rotate toward the disengaged configuration, thereby decreasing a force applied to the circular saw blade by the brake cam. After at least a threshold degree of angular rotation, the brake cam may return to the disengaged configuration, such as via action of cam-biasing mechanism 144.

Figure 20:
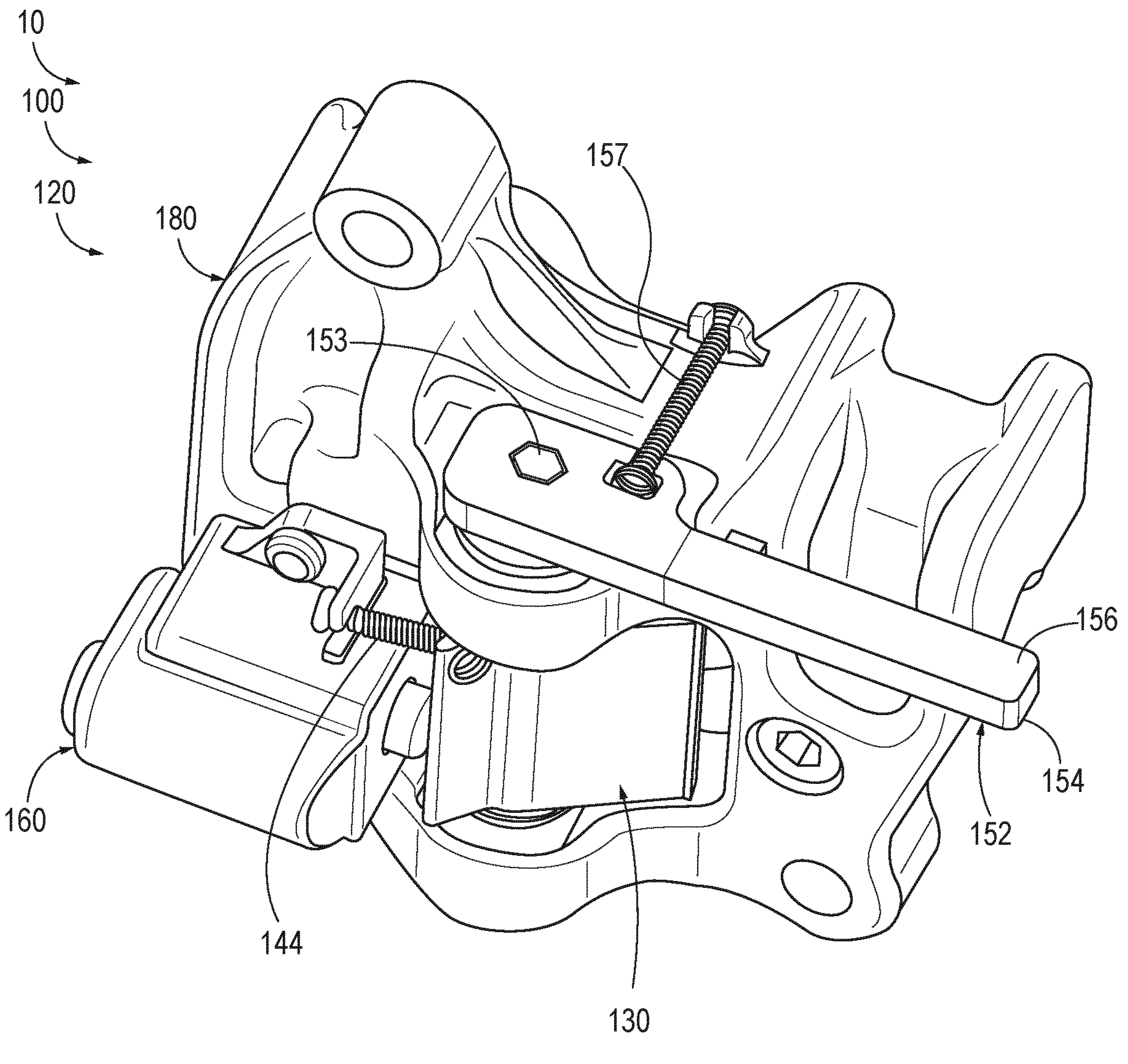
FIG. 20 is a schematic illustration of an example of another reset mechanism according to the present disclosure.

Another example of reset mechanism 146 includes a cam rotation structure 152, as illustrated in FIGS. 1-2 and 20. Cam rotation structure 152 may be attached to, selectively attached to, and/or associated with brake cam 130 and/or may be configured to selectively rotate the brake cam away from the circular saw blade. For example, cam rotation structure 152 may be configured to be selectively actuated by the user to rotate the brake cam away from the circular saw blade, such as by engaging a cam engagement structure 153 with a tool. In some such examples, cam rotation structure 152 may include and/or be a cam rotation tool 154, such as a wrench. In other examples, the cam rotation tool may be permanently, or at least substantially permanently, attached to the safety brake and/or may be configured to be selectively engaged, or interlocked, with the brake cam, such as with the cam engagement structure 153 of the brake cam, as illustrated in FIG. 20. The cam rotation tool may be utilized to rotate the brake cam away from the circular saw blade. In some examples, the cam rotation structure may include and/or be pretensioned lever 156, such as which may be tensioned by a lever spring 157, as illustrated in FIG. 20.

As discussed, safety brake 100 may be utilized to protect the user of circular saw 10 from injury, such as may be caused by contact between the user and a rotating circular saw blade 40. To facilitate this protection, brake assembly 120 may be configured to transition brake cam 130 from the disengaged configuration to the engaged configuration within a threshold transition time. Examples of the threshold transition time include threshold transition times of at least 0.1 milliseconds (ms), at least 0.5 ms, at least 1 ms, at least 2 ms, at least 3 ms, at least 4 ms, at least 5 ms, at most 10 ms, at most 9 ms, at most 8 ms, at most 7 ms, at most 6 ms, at most 5 ms, at most 4 ms, at most 3 ms, and/or at most 2 ms.

The speed at which brake cam 130 transitions from the disengaged configuration to the engaged configuration may be measured and/or quantified in any suitable manner. As an example, a high-speed camera with a frame speed of, for example, 50,000 frames per second, has been utilized to observe the circular saw blade and/or the brake cam during rotation of the circular saw blade. A light, such as a light emitting diode, also was visible to the camera and was configured to illuminate responsive to the trigger signal being received by the actuator assembly. In such a configuration, counting a number of frames from illumination of the light until the cam reaches the engaged position was utilized to quantify the time needed for brake assemblies 120 to transition from disengaged configuration 140 to engaged configuration 142. The observed time was, in various configurations, within the above-described ranges. In the same manner, counting a number of frames from illumination of the light until rotation of the circular saw blade ceases was utilized to quantify the time needed for brake assemblies 120 to stop rotation of the circular saw blade. The observed time was, in various configurations, within the above-described ranges.

In some examples, and as illustrated in dashed lines in FIGS. 1-2, circular saws 10 and/or safety brakes 100 may include an interlock assembly 220. Interlock assembly 220, when present, may be configured to permit, or to selectively permit, supply of electric current to motor 20 when safety brake 100 is configured to selectively resist rotation of the circular saw blade. Additionally or alternatively, interlock assembly 220 may be configured to block, or to selectively block, supply of electric current to the motor when at least one component of the safety brake is not configured, or unable, to selectively resist rotation of the circular saw blade. Stated another way, interlock assembly 220 may be configured to permit the motor to rotate the circular saw blade when the configuration of safety brake 100 is such that the safety brake will protect the individual from contact with the rotating circular saw blade, and interlock assembly 220 may be configured not to permit the motor to rotate the circular saw blade when the configuration of safety brake 100 is such that the safety brake cannot protect the individual from contact with the rotating circular saw blade.

As an example, interlock assembly 220 may include a sensor status detector configured to indicate a status of sensor assembly 110. In some such examples, interlock assembly 220 may not permit the motor to drive the rotation of the circular saw blade if the sensor status detector indicates that the sensor assembly is not configured to detect the actuation parameter, such as may be caused by a failure of the sensor assembly and/or electrical interference with the sensor assembly. Additionally or alternatively, the interlock assembly may permit the motor to drive the rotation of the circular saw blade if the sensor status detector indicates that the sensor assembly is configured to detect the actuation parameter.

As another example, interlock assembly 220 may include a brake assembly status detector configured to indicate a status of brake assembly 120. In some such examples, interlock assembly 220 may not permit the motor to drive the rotation of the circular saw blade if the brake assembly status detector indicates that the brake assembly is not configured to selectively resist rotation of the circular saw blade, such as may be caused by a failure of the brake assembly, a maladjustment of the brake assembly, and/or a failure of an operator to properly reset the brake assembly. Additionally or alternatively, the interlock assembly may permit the motor to drive the rotation of the circular saw blade if the brake assembly status detector indicates that the brake assembly is configured to selectively resist rotation of the circular saw blade.

As yet another example, interlock assembly 220 may include an actuator assembly status detector configured to indicate a status of actuator assembly 160. In some such examples, interlock assembly 220 may not permit the motor to drive the rotation of the circular saw blade if the actuator assembly status detector indicates that the actuator assembly is not configured to selectively urge the brake cam into contact with the circular saw blade, such as may be caused by a failure of the actuator assembly and/or debris build-up proximate the actuator assembly and/or the brake cam. Additionally or alternatively, the interlock assembly may permit the motor to drive the rotation of the circular saw blade if the actuator assembly status detector indicates that the actuator assembly is configured to selectively urge the brake cam into contact with the circular saw blade.

Interlock assembly 220 additionally or alternatively may include any suitable structure that may be adapted, configured, designed, and/or programmed to permit, or to selectively permit, supply of electric current to motor 20 when safety brake 100 is configured to selectively resist rotation of the circular saw blade. As examples, interlock assembly 220 may include a transistor, a relay, a switch, an electric switch, and/or a controller. When the interlock assembly includes the controller, the controller may be programmed to control the operation of the interlock assembly and/or to perform the functions of the interlock assembly that are disclosed herein.

Figure 21:
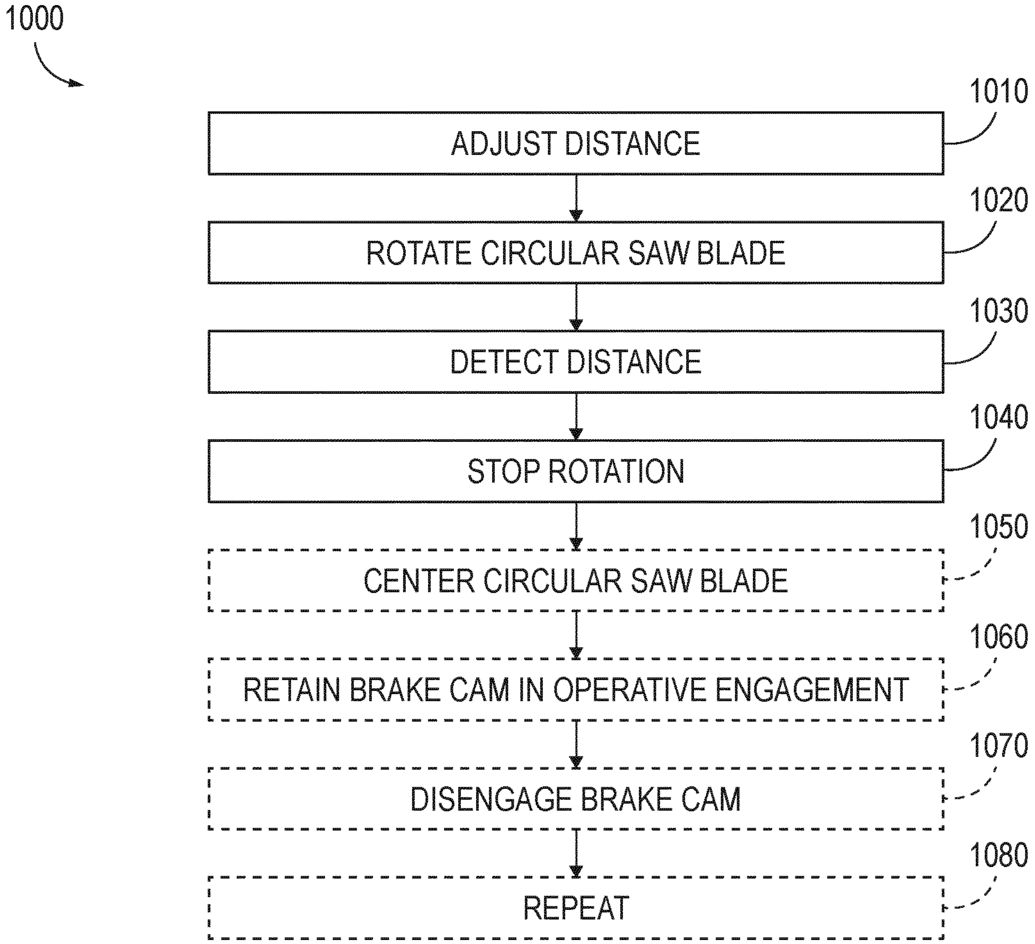
FIG. 21 is a flowchart illustrating examples of methods of operating circular saws, according to the present disclosure.

Circular saws that include safety brakes, such as circular saws 10 that include brake assemblies 120, according to the present disclosure, may be operated in a manner that protects an individual, such as a user of the circular saw, from injury caused by contact with a rotating circular saw blade of the circular saw. Such operation may be referred to herein as a method of operating a circular saw, and examples of such methods are disclosed herein. With this in mind, FIG. 21 is a flowchart illustrating examples of methods 1000 of operating circular saws, according to the present disclosure, such as circular saws 10 of FIGS. 1-20.

Methods 1000 may include adjusting a distance at 1010 and include rotating a circular saw blade at 1020, detecting a distance at 1030, and stopping rotation at 1040. Methods 1000 also may include centering the circular saw blade at 1050, retaining a brake cam in operative engagement at 1060, disengaging the brake cam at 1070, and/or repeating at least a subset of the methods at 1080.

Adjusting the distance at 1010 may include adjusting a distance between the brake cam and the circular saw blade. In some examples, the adjusting at 1010 may be performed prior to the rotating. In some such examples, the adjusting at 1010 may be performed utilizing a floating attachment mechanism, examples of which are disclosed herein with reference to attachment mechanism 200. In some examples, and subsequent to the adjusting, the methods further may include fixing, locking in, and/or retaining the adjustment, such as via a floating attachment lock mechanism of the circular saw.

Rotating the circular saw blade at 1020 may include rotating the circular saw blade with, via, and/or utilizing a motor and/or an arbor of the circular saw. Examples of the motor are disclosed herein with reference to motor 20. Examples of the arbor are disclosed herein with reference to arbor 30.

Detecting the distance at 1030 may include that a distance between the individual and the circular saw blade is less than a threshold distance. The detecting at 1030 may include detecting with, via, and/or utilizing a sensor assembly, examples of which are disclosed herein with reference to sensor assembly 110. Examples of the threshold distance also are disclosed herein.

Stopping rotation at 1040 may include stopping rotation of the circular saw blade and may be performed subsequent to the rotating at 1020 and/or responsive to the detecting at 1030. Stated another way, methods 1000 may initiate the stopping at 1040 responsive to the detecting at 1030 indicating that the distance between the individual and the circular saw blade is less than the threshold distance. The stopping at 1040 may include stopping with, via, and/or utilizing a brake assembly of the circular saw. Examples of the brake assembly are disclosed herein with reference to brake assembly 120.

As discussed in more detail herein, the brake assembly includes a brake cam. With this in mind, the stopping at 1040 includes operatively engaging a planar side surface of the circular saw blade with the brake cam to stop rotation of the circular saw blade. The stopping at 1040 also may include directly engaging a solenoid armature of a solenoid of the brake assembly with the brake cam, such as to urge the brake cam into contact with the planar side surface of the circular saw blade. The stopping at 1040 additionally or alternatively may include rotating the brake cam about a cam axis of rotation that is perpendicular, or at least substantially perpendicular, to an actuation axis of an actuator assembly of the brake cam.

In some examples, the stopping at 1040 may include compressing the circular saw blade between the brake cam and a brake pad of the brake assembly. In some examples, the stopping at 1040 may include pivoting a friction surface of the brake pad relative to the planar side surface of the circular saw blade. The pivoting may be during the compressing and/or may produce and/or generate the compressing.

In some examples, the stopping at 1040 may include urging the brake cam into contact with the planar side wall surface of the circular saw blade utilizing an actuator assembly biasing mechanism of the brake assembly. In some such examples, the stopping at 1040 further may include releasing the brake cam utilizing a release mechanism, and the urging may be responsive to the releasing.

Centering the circular saw blade at 1050 may include centering the circular saw blade between the brake cam and the brake pad. The centering at 1050 may be performed during and/or responsive to the stopping at 1040, such as via a floating attachment mechanism that attaches the brake assembly to a remainder of the circular saw.

Retaining the brake cam in operative engagement at 1060 may include retaining the brake cam in operative engagement with the circular saw blade. The retaining at 1060 may be performed subsequent to, responsive to, and/or as a result of the stopping at 1040. In some examples, the retaining at 1060 may include resisting rotation of the circular saw blade prior to actuation of a reset mechanism of the circular saw. Stated another way, and subsequent to the stopping at 1040, the retaining at 1060 may stop the circular saw blade from rotating until the reset mechanism is actuated, thereby indicating that a user of the circular saw is ready to resume operation of the circular saw to cut a workpiece.

Disengaging the brake cam at 1070 may include disengaging the brake cam from the circular saw blade and may be performed subsequent to the stopping at 1040. The disengaging at 1070 may include disengaging to permit subsequent rotation of the circular saw blade, to permit re-use of the circular saw blade, to permit re-use of the brake assembly, and/or reset the circular saw. In some examples, the disengaging at 1070 may include disengaging without removing the circular saw blade from the circular saw, without removing the brake assembly from the circular saw, without damage to the circular saw blade, and/or without damage to the brake assembly.

The disengaging at 1070 may be performed in any suitable manner. As an example, the disengaging at 1070 may include rotating the cam away from the circular saw blade. In some such examples, the cam may be rotated away from the circular saw blade via rotation of the circular saw blade in a direction that is opposed to a direction of rotation when the circular saw blade is utilized to cut the workpiece. In some such examples, the cam may be rotated away from the circular saw blade via actuation of the reset mechanism of the circular saw. In some such examples, a separate cam rotation tool may be utilized to disengage the cam from the circular saw blade.

Repeating at least the subset of the methods at 1080 may include repeating any suitable step and/or steps of methods 1000 in any suitable manner. As an example, and subsequent to the disengaging at 1070, the repeating at 1080 may include repeating the rotating at 1020, such as to permit and/or facilitate cutting of the workpiece by the circular saw. In some such examples, the repeating at 1080 may include repeating without replacing the circular saw blade and/or without replacing the brake cam. Stated another way, and as discussed, the brake assembly may be configured for repeated use, or re-use, without damage to and/or replacement of the brake cam and/or the circular saw blade.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

In the event that any patents, patent applications, or other references are incorporated by reference herein and (1) define a term in a manner that is inconsistent with and/or (2) are otherwise inconsistent with, either the non-incorporated portion of the present disclosure or any of the other incorporated references, the non-incorporated portion of the present disclosure shall control, and the term or incorporated disclosure therein shall only control with respect to the reference in which the term is defined and/or the incorporated disclosure was present originally.

As used herein the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

As used herein, "at least substantially," when modifying a degree or relationship, may include not only the recited "substantial" degree or relationship, but also the full extent of the recited degree or relationship. A substantial amount of a recited degree or relationship may include at least 75% of the recited degree or relationship. For example, an object that is at least substantially formed from a material includes objects for which at least 75% of the objects are formed from the material and also includes objects that are completely formed from the material. As another example, a first length that is at least substantially as long as a second length includes first lengths that are within 75% of the second length and also includes first lengths that are as long as the second length.

Illustrative, non-exclusive examples of safety brake assemblies, circular saws, and methods according to the present disclosure are presented in the following enumerated paragraphs. It is within the scope of the present disclosure that an individual step of a method recited herein, including in the following enumerated paragraphs, may additionally or alternatively be referred to as a "step for" performing the recited action.

A1. A safety brake for a circular saw, the safety brake comprising:

a sensor assembly configured to detect an actuation parameter and to generate a trigger signal responsive to detection of the actuation parameter;

a brake assembly including a brake cam configured to selectively transition between a disengaged configuration in which the brake cam is spaced apart from a blade-receiving region of the safety brake, wherein the blade-receiving region is configured to receive a circular saw blade, and an engaged configuration in which the brake cam extends into the blade-receiving region and is configured to operatively engage a planar side surface of the circular saw blade and thus to resist rotation of the circular saw blade; and an actuator assembly configured to selectively transition the brake cam from the disengaged configuration to the engaged configuration responsive to receipt of the trigger signal from the sensor assembly.

A1.1 The safety brake of paragraph A1, wherein the actuation parameter includes an undesired event parameter indicative of an undesired event to be avoided with the circular saw.

A1.2 The safety brake of any of paragraphs A1-A1.1, wherein the actuation parameter includes a kickback parameter indicative of a potential for kickback of the circular saw.

A1.3 The safety brake of any of paragraphs A1-A1.2, wherein the actuation parameter includes a movement parameter indicative of an undesired movement of the circular saw.

A1.4 The safety brake of any of paragraphs A1-A1.3, wherein the actuation parameter includes a proximity parameter indicative of a distance between an individual and the circular saw blade being less than a threshold distance.

A1.4.1 The safety brake of paragraph A1.4, wherein the threshold distance is one of less than 5 millimeters (mm), less than 4 mm, less than 3 mm, less than 2 mm, less than 1 mm, or less than 0.5 mm A1.4.2 The safety brake of any of paragraphs A1.4-A1.4.1, wherein the threshold distance includes contact between the individual and the circular saw blade.

A2. The safety brake of any of paragraphs A1-A1.4.2, wherein the brake assembly is a non-destructive brake assembly configured to selectively stop rotation of the circular saw blade.

A3. The safety brake of any of paragraphs A1-A2, wherein the brake assembly is a resettable brake assembly configured to be selectively and repeatedly transitioned between the disengaged configuration and the engaged configuration.

A4. The safety brake of any of paragraphs A1-A3, wherein the brake assembly is configured to resist rotation of the circular saw blade at least one of:

(i) without damage to the circular saw blade; and (ii) without damage to the brake assembly.

A5. The safety brake of any of paragraphs A1-A4, wherein, when in the engaged configuration, the brake cam is at least one of:

(i) free from engagement with teeth of the circular saw blade; and (ii) spaced apart from the teeth of the circular saw blade.

A6. The safety brake of any of paragraphs A1-A5, wherein the brake cam is configured to rotate about a cam axis of rotation to selectively transition between the disengaged configuration and the engaged configuration.

A7. The safety brake of paragraph A6, wherein the blade-receiving region is a planar, or an at least substantially planar, blade-receiving region, and further wherein the cam axis of rotation is parallel, or at least substantially parallel, to the planar blade-receiving region.

A8. The safety brake of any of paragraphs A1-A7, wherein the brake cam includes a cam-biasing mechanism that biases the brake cam toward the disengaged configuration.

A9. The safety brake of paragraph A8, wherein the cam-biasing mechanism includes at least one of:

(i) a resilient cam-biasing mechanism;

(ii) a cam-biasing spring; and (iii) a cam-biasing torsion spring.

A10. The safety brake of any of paragraphs A1-A9, wherein the brake cam defines a blade-engaging surface configured to operatively engage the planar side surface of the circular saw blade.

A11. The safety brake of paragraph A10, wherein the blade-engaging surface is shaped such that the brake cam presses progressively harder against the circular saw blade as the brake cam transitions from the disengaged configuration to the engaged configuration.

A12. The safety brake of any of paragraphs A10-A11, wherein the blade-engaging surface defines an eccentric profile.

A13. The safety brake of any of paragraphs A10-A12, wherein the blade-engaging surface defines a logarithmic spiral profile.

A13.1. The safety brake of any of paragraphs A10-A13, wherein the blade-engaging surface defines a region of increasing radius, optionally relative to a/the cam axis of rotation of the brake cam, and a region of constant radius, optionally relative to the cam axis of rotation of the brake cam.

A13.2. The safety brake of paragraph A13.1, wherein the brake cam is configured initially to operatively engage the circular saw blade with the region of increasing radius and subsequently to operatively engage the circular saw blade with the region of constant radius.

A14. The safety brake of any of paragraphs A10-A13.2, wherein the blade-engaging surface includes a cam friction material selected to increase a coefficient of friction between the blade-engaging surface and the circular saw blade.

A15. The safety brake of paragraph A14, wherein the cam friction material includes at least one of:

(i) a diamond coating;

(ii) an abrasive material;

(iii) an abrasive grit coating;

(iv) a ceramic material;
(v) a sintered material; and
(vi) a metal alloy.

A16. The safety brake of any of paragraphs A10-A15, wherein the brake cam includes a blade-engaging surface insert that is operatively attached to a remainder of the brake cam and defines the blade-engaging surface.

A17. The safety brake of any of paragraphs A10-A16, wherein the blade-engaging surface is integral to the brake cam.

A18. The safety brake of any of paragraphs A10-A17, wherein the blade-engaging surface is at least one of applied to the brake cam and coats the brake cam.

A19. The safety brake of any of paragraphs A1-A18, wherein, subsequent to being transitioned from the disengaged configuration to the engaged configuration, the brake cam is shaped to remain in the engaged configuration optionally until the brake cam is released from the engaged configuration by a user of the circular saw.

A20. The safety brake of paragraph A19, wherein the operative engagement between the circular saw blade and the brake cam retains the brake cam in the engaged configuration.

A21. The safety brake of any of paragraphs A1-A20, wherein the brake assembly includes a stop configured to limit rotation of the brake cam.

A22. The safety brake of paragraph A21, wherein the stop includes a disengaged configuration stop configured to limit rotation of the brake cam away from the blade-receiving region while the brake cam is in the disengaged configuration.

A23. The safety brake of any of paragraphs A21-A22, wherein the stop includes an engaged configuration stop configured to limit rotation of the brake cam toward the blade-receiving region while the brake cam is in the engaged configuration.

A24. The safety brake of any of paragraphs A21-A23, wherein the stop is at least partially defined by the brake cam.

A24.1. The safety brake of any of paragraphs A21-A24, wherein the stop is distinct from the brake cam and is configured to operatively engage with the brake cam to limit rotation of the brake cam.

A25. The safety brake of any of paragraphs A1-A24.1, wherein the brake assembly further includes a housing configured to operatively support the brake cam and the actuator assembly.

A26. The safety brake of paragraph A25, wherein the housing at least partially surrounds the blade-receiving region.

A27. The safety brake of any of paragraphs A25-A26, wherein the housing includes a split housing configured to be disassembled into at least two housing regions.

A28. The safety brake of any of paragraphs A1-A27, wherein the brake assembly further includes a brake pad that includes a pad friction material.

A29. The safety brake of paragraph A28, wherein the brake pad is positioned, relative to the brake cam, such that the pad friction material faces toward the brake cam.

A30. The safety brake of any of paragraphs A28-A29, wherein the brake pad is positioned, relative to the brake cam, such that the blade-receiving region extends at least partially between the brake pad and the brake cam.

A31. The safety brake of any of paragraphs A28-A30, wherein the brake pad includes an adjustment mechanism configured to selectively adjust a distance between the brake pad and the brake cam.

A32. The safety brake of any of paragraphs A28-A31, wherein the planar side surface of the circular saw blade is a first planar side surface of the circular saw blade, wherein the circular saw blade includes a second planar side surface, which is opposed to the first planar side surface, and further wherein the pad friction material is configured to operatively engage the second planar side surface of the circular saw blade.

A33. The safety brake of any of paragraphs A28-A32, wherein the brake assembly is configured such that, when the brake cam is in the engaged configuration, the blade is compressed between the brake pad and the brake cam.

A33.1. The safety brake of any of paragraphs A28-A33, wherein the brake pad includes a pivotal pad mount configured to permit limited rotation of the brake pad at least one of:
(i) about at least one pivot axis; and
(ii) about a pivot point.

A33.2. The safety brake of paragraph A33.1, wherein the pivotal pad mount is configured to permit limited rotation of the brake pad about a plurality of pivot axes.

A33.3. The safety brake of any of paragraphs A33.1-A33.2, wherein the pivotal pad mount includes a concave mount component, which defines a concave recessed region, and a convex mount component, which is shaped to be received within the concave recessed region, and further wherein the pivotal pad mount is configured to permit the limited rotation of the brake pad via relative motion between the concave mount component and the convex mount component.

A33.4. The safety brake of paragraph A33.3, wherein the pivotal pad mount further includes a mount fastener that operatively attaches the concave mount component and the convex mount component to one another.

A33.5. The safety brake of paragraph A33.4, wherein the concave mount component includes an aperture, and further wherein the mount fastener extends through the aperture.

A33.6. The safety brake of any of paragraphs A33.1-A33.5, wherein the pivot point is at least one of:
(i) spaced apart from a friction surface of the brake pad; and
(ii) coplanar with the friction surface of the brake pad.

A33.7. The safety brake of any of paragraphs A33.1-A33.6, wherein the brake pad is operatively attached to a remainder of the safety brake via the pivotal pad mount.

A34. The safety brake of any of paragraphs A1-A33.7, wherein the safety brake further includes an attachment mechanism configured to operatively attach at least a portion of the safety brake to the circular saw.

A35. The safety brake of paragraph A34, wherein the attachment mechanism includes a floating attachment mechanism configured to permit the blade-receiving region to operatively translate relative to a remainder of the circular saw, optionally along a float axis that is at least substantially perpendicular to the planar side surface of the circular saw blade.

A36. The safety brake of paragraph A35, wherein the floating attachment mechanism includes an attachment pin, and further wherein the attachment mechanism is configured to permit the blade-receiving region to operatively translate relative to the remainder of the circular saw and along a longitudinal axis of the attachment pin.

A36.1. The safety brake of any of paragraphs A35-A36, wherein the floating attachment mechanism includes a floating attachment mechanism lock configured selectively to permit, and selectively to restrict, operative translation of the blade-receiving region relative to the remainder of the circular saw.

A37. The safety brake of any of paragraphs A1-A36.1, wherein the actuator assembly is an electrical actuator assembly.

A38. The safety brake of any of paragraphs A1-A37, wherein the actuator assembly includes a power source configured to power the actuator assembly, optionally wherein the power source includes a capacitor.

A39. The safety brake of any of paragraphs A1-A38, wherein the actuator assembly includes an actuator arm configured to selectively transition the brake cam from the disengaged configuration to the engaged configuration.

A40. The safety brake of any of paragraphs A1-A39, wherein the actuator assembly includes an electromagnet configured to selectively transition the brake cam from the disengaged configuration to the engaged configuration.

A41. The safety brake of any of paragraphs A1-A40, wherein the actuator assembly includes an actuator solenoid that includes a solenoid armature, wherein the solenoid armature is configured to operatively engage the brake cam to transition the brake cam from the disengaged configuration to the engaged configuration.

A42. The safety brake of paragraph A41, wherein the solenoid armature is in direct physical contact with the brake cam as the actuator assembly transitions the brake cam from the disengaged configuration to the engaged configuration.

A43. The safety brake of any of paragraphs A1-A42, wherein the actuator assembly includes at least one of:

(i) a shape memory alloy actuator assembly;

(ii) a magnetoresistive actuator assembly;

(iii) a pneumatic actuator assembly;

(iv) a hydraulic actuator assembly;

(v) an explosive actuator assembly;

(vi) a piezoelectric actuator assembly;

(vii) a thermic actuator assembly;

(viii) a permanent magnet actuator assembly;

(ix) an electroactive polymer actuator assembly;

(x) a resilient biasing mechanism; and (xi) a resilient biasing mechanism in combination with a release mechanism.

A43.1. The safety brake of any of paragraphs A1-A43, wherein the actuator assembly includes an actuator assembly biasing mechanism and a/the release mechanism, wherein the release mechanism is configured to selectively permit the actuator assembly biasing mechanism to transition the brake cam from the disengaged configuration to the engaged configuration responsive to receipt of the trigger signal.

A43.2. The safety brake of paragraph A43.1, wherein the actuator assembly biasing mechanism includes at least one of:

(i) a/the resilient biasing mechanism; and (ii) a spring.

A44. The safety brake of any of paragraphs A1.4-A43.2, wherein the sensor assembly includes a proximity sensor configured to detect the proximity parameter.

A45. The safety brake of any of paragraphs A1-A44, wherein the sensor assembly includes a capacitive sensor assembly configured to detect the actuation parameter.

A46. The safety brake of any of paragraphs A1-A45, wherein the safety brake further includes a deflection-mitigating structure configured to resist deflection of the saw blade into contact with the brake cam when the circular saw is utilized to cut a workpiece and the brake cam is in the disengaged configuration.

A47. The safety brake of paragraph A46, wherein the deflection-mitigating structure at least partially defines the blade-receiving region.

A48. The safety brake of any of paragraphs A46-A47, wherein the deflection-mitigating structure includes a deflection-mitigating surface configured to operatively contact the circular saw blade when the circular saw blade is deflected toward the brake cam to resist deflection of the blade into contact with the brake cam.

A49. The safety brake of paragraph A48, wherein the deflection-mitigating structure includes an electrically insulating structure configured to electrically insulate the deflection-mitigating surface from a remainder of the safety brake.

A49.1. The safety brake of paragraph A49, wherein the deflection-mitigating structure is defined by an electrically insulating material and defines the deflection-mitigating surface.

A49.2. The safety brake of any of paragraphs A49-A49.1, wherein the electrically insulating structure includes an electrically insulating spacer that electrically isolates the deflection-mitigating surface from the remainder of the safety brake.

A49.3. The safety brake of paragraph A49, wherein the electrically insulating structure is formed from a ceramic material.

A50. The safety brake of any of paragraphs A1-A49, wherein the safety brake further includes a reset mechanism configured to, or to permit a/the user of the circular saw to, selectively transition the brake cam from the engaged configuration to the disengaged configuration.

A51. The safety brake of paragraph A50, wherein the reset mechanism includes an eccentric structure configured to operatively translate the brake cam away from the blade-receiving region.

A52. The safety brake of any of paragraphs A50-A51, wherein the reset mechanism includes a pressure-actuated reset mechanism configured to at least one of:

(i) operatively translate the brake cam away from the blade-receiving region; and (ii) operatively translate a/the brake pad of the brake assembly away from the blade-receiving region.

A52.1. The safety brake of any of paragraphs A50-A52, wherein the reset mechanism includes a cam rotation structure configured to selectively rotate the brake cam away from the circular saw blade.

A52.2. The safety brake of paragraph A52.1, wherein the cam rotation structure includes a cam rotation tool configured to be selectively engaged with the brake cam to rotate the brake cam away from the circular saw blade.

A52.3. The safety brake of any of paragraphs A52.1-A52.2, wherein the cam rotation structure includes a pretensioned lever.

A53. The safety brake of any of paragraphs A1-A52, wherein the brake assembly is configured to transition the brake cam from the disengaged configuration to the engaged configuration in at least one of:

(i) at least 0.1 milliseconds (ms), at least 0.5 ms, at least 1 ms, at least 2 ms, at least 3 ms, at least 4 ms, or at least 5 ms; and (ii) at most 10 ms, at most 9 ms, at most 8 ms, at most 7 ms, at most 6 ms, at most 5 ms, at most 4 ms, at most 3 ms, or at most 2 ms.

A54. The safety brake of any of paragraphs A1-A53, wherein the safety brake further includes an interlock assembly configured to:

(i) permit supply of electric current to a motor of the circular saw when the safety brake is configured to selectively resist rotation of the circular saw blade; and (ii) block supply of electric current to the motor of the circular saw when at least one component of the safety brake is not configured to selectively resist rotation of the circular saw blade.

A55. The safety brake of paragraph A54, wherein the interlock assembly includes at least one of:

(i) a sensor status detector configured to indicate a status of the sensor assembly;

(ii) a brake assembly status detector configured to indicate a status of the brake assembly; and (iii) an actuator assembly status detector configured to indicate a status of the actuator assembly.

A56. The safety brake of any of paragraphs A1-A55, wherein the safety brake is free from a pivotal linkage between the brake cam and the actuator assembly.

A57. The safety brake of any of paragraphs A1-A56, wherein a/the cam axis of rotation of the brake cam is perpendicular, or at least substantially perpendicular, to an actuation axis of the actuator assembly.

A58. The safety brake of any of paragraphs A1-A57, wherein the brake assembly includes a single brake cam.

A59. The safety brake of any of paragraphs A1-A58, wherein the brake assembly is a locking brake assembly configured to remain in the engaged configuration once the brake cam operatively engages the circular saw blade.

B1. A circular saw, comprising:

a motor including a motor shaft configured to rotate about a shaft rotational axis;

an arbor operatively attached to the motor shaft;

the safety brake of any of paragraphs A1-A59; and a circular saw blade, wherein the circular saw blade is operatively attached to the circular saw via the arbor and extends at least partially within the blade-receiving region of the brake assembly.

B2. The circular saw of paragraph B1, wherein the motor includes an electric motor.

B3. The circular saw of any of paragraphs B1-B2, wherein the arbor is configured to facilitate selective and repeated separation of the circular saw blade from a remainder of the circular saw.

B4. The circular saw of any of paragraphs B1-B3, wherein the arbor includes a threaded arbor.

B5. The circular saw of any of paragraphs B1-B4, wherein the circular saw further includes a gripping region configured to be gripped by a/the user of the circular saw.

B6. The circular saw of any of paragraphs B1-B5, wherein the circular saw further includes a switch configured to selectively apply an electric current to the motor to provide a motive force for rotation of the motor shaft.

B7. The circular saw of any of paragraphs B1-B6, wherein the circular saw further includes a blade guard configured to prevent contact between a/the user and the saw blade.

B8. The circular saw of paragraph B7, wherein the blade guard includes a retractable region configured to retract when the circular saw is utilized to cut a/the workpiece.

B9. The circular saw of any of paragraphs B7-B8, wherein at least a region of the blade guard is defined by the safety brake.

B10. The circular saw of any of paragraphs B1-B9, wherein the circular saw further includes a workpiece support configured to support a workpiece when the workpiece is cut by the circular saw.

B11. The circular saw of any of paragraphs B1-B10, wherein the circular saw further includes at least one of:

(i) a power cord configured to provide electric current to the circular saw; and (ii) a battery configured to provide electric current to the circular saw.

B12. The circular saw of any of paragraphs B1-B11, wherein the circular saw includes at least one of:

(i) a handheld circular saw;

(ii) a miter saw;

(iii) a radial arm saw;

(iv) a table saw;

(v) a chop saw;

(vi) a plunge saw;

(vii) a track saw;

(viii) an up cut saw; and (ix) a panel saw.

B13. The circular saw of any of paragraphs B1-B12, wherein the circular saw further includes a clutch configured to decrease a potential for damage to at least one component of the circular saw when the safety brake transitions from the disengaged configuration to the engaged configuration to stop rotation of the circular saw blade.

B14. The circular saw of paragraph B13, wherein the arbor at least partially defines the clutch.

B15. The circular saw of any of paragraphs B13-B14, wherein the clutch is configured to:

(i) selectively permit relative rotation between the circular saw blade and the motor shaft when a torque between the circular saw blade and the motor shaft exceeds a threshold torque; and (ii) resist relative rotation between the circular saw blade and the motor shaft when the torque between the circular saw blade and the motor shaft is less than the threshold torque.

B16. The circular saw of any of paragraphs B1-B15, wherein the circular saw further includes a blade isolation structure configured to electrically isolate the circular saw blade from at least one other component of the circular saw.

C1. A method of operating a circular saw, the method comprising:

rotating a circular saw blade of the circular saw;

detecting, with a sensor assembly of the circular saw, that a distance between an individual and the circular saw blade is less than a threshold distance; and responsive to the detecting, stopping rotation of the circular saw blade utilizing a brake assembly of the circular saw, wherein the brake assembly includes a brake cam, and further wherein the stopping includes operatively engaging a planar side surface of the circular saw blade with the brake cam to stop rotation of the circular saw blade.

C2. The method of paragraph C1, wherein, subsequent to the stopping, the method further includes retaining the brake cam in operative engagement with the circular saw blade prior to actuation of a reset mechanism of the circular saw.

C3. The method of any of paragraphs C1-C2, wherein the method further includes disengaging the brake cam from the circular saw blade.

C3.1. The method of paragraph C3, wherein the disengaging includes disengaging to at least one of:

(i) permit subsequent rotation of the circular saw blade;

(ii) permit re-use of the circular saw blade;

(iii) permit re-use of the brake assembly; and (iv) reset the circular saw.

C3.2. The method of any of paragraphs C3-C3.1, wherein, subsequent to the disengaging, the method further includes repeating at least the rotating.

C3.3. The method of paragraph C3.2, wherein the repeating the rotating includes repeating the rotating without replacing the circular saw blade and without replacing the brake cam.

C4. The method of paragraph C3, wherein the disengaging the brake cam includes disengaging at least one of:

(i) without removing the circular saw blade from the circular saw;

(ii) without removing the brake assembly from the circular saw;

(iii) without damage to the circular saw blade; and (iv) without damage to the brake assembly.

C5. The method of any of paragraphs C1-C4, wherein the stopping includes directly engaging a solenoid armature of a solenoid of the brake assembly with the brake cam.

C6. The method of any of paragraphs C1-05, wherein the stopping includes rotating the brake cam about a cam axis of rotation that is perpendicular, or at least substantially perpendicular, to an actuation axis of an actuator assembly of the brake assembly.

C6.1. The method of any of paragraphs C1-C6, wherein the stopping includes compressing the circular saw blade between the brake cam and a brake pad of the brake assembly.

C6.2. The method of paragraph C6.1, wherein the stopping further includes pivoting a friction surface of the brake pad relative to a planar side surface of the circular saw blade during the compressing.

C6.3. The method of any of paragraphs C6.1-C6.2, wherein, during the stopping, the method further includes centering the circular saw blade between the brake cam and the brake pad.

C6.4. The method of any of paragraphs C1-C6.3, wherein, prior to the rotating, the method further includes adjusting a distance between the brake cam and the circular saw blade utilizing a floating attachment mechanism of the circular saw.

C6.5. The method of any of paragraphs C1-C6.4, wherein the stopping includes urging the brake cam into contact with the planar side surface of the circular saw blade utilizing an actuator assembly biasing mechanism of the brake assembly.

C6.6. The method of paragraph C6.5, wherein, prior to the urging, the stopping further includes releasing the brake cam utilizing a release mechanism, wherein the urging is responsive to the releasing.

C7. The method of any of paragraphs C1-C6.6, wherein the brake assembly includes any suitable structure of any of the safety brakes of any of paragraphs A1-A59.

C8. The method of any of paragraphs C1-C7, wherein the circular saw includes any suitable structure of any of the circular saws of any of paragraphs B1-B16.

D1. The use, in a circular saw, of a brake assembly that includes a brake cam to selectively resist rotation of a circular saw blade.

D2. The use, in a circular saw, of a brake cam to selectively stop a circular saw blade of the circular saw.

D3. The use, in a circular saw, of a reset mechanism to selectively permit rotation of a circular saw blade of the circular saw subsequent to stopping rotation of the circular saw blade with a brake assembly of the circular saw.

D4. The use, in a circular saw, of an actuator assembly to directly contact a brake cam to transition the brake cam from a disengaged configuration, in which the brake cam is spaced apart from a circular saw blade of the circular saw, and an engaged configuration, in which the brake cam operatively engages the circular saw blade and resists rotation of the circular saw blade.

D5. The use of any of the safety brakes of any of paragraphs A1-A59 or any of the circular saws of any of paragraphs B1-B16 with any of the methods of any of paragraphs C1-C8.

D6. The use of any of the methods of any of paragraphs C1-C8 with any of the safety brakes of any of paragraphs A1-A59 or any of the circular saws of any of paragraphs B1-B16.

INDUSTRIAL APPLICABILITY

The safety brake assemblies, circular saws, and methods disclosed herein are applicable to the power tool industry.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. A safety brake for a circular saw, the safety brake comprising:

a sensor assembly configured to detect an actuation parameter and to generate a trigger signal responsive to detection of the actuation parameter;

a brake assembly including:

(i) a housing;

(ii) a brake cam configured to selectively transition between a disengaged configuration in which the brake cam is spaced apart from a blade-receiving region of the safety brake, wherein the blade-receiving region is configured to receive a circular saw blade, and an engaged configuration in which the brake cam extends into the blade-receiving region and is configured to operatively engage a planar side surface of the circular saw blade and thus to resist rotation of the circular saw blade; and (iii) a brake pad that includes a pad friction material, wherein the brake pad is positioned, relative to the brake cam, such that the pad friction material faces toward the brake cam; and an actuator assembly configured to selectively transition the brake cam from the disengaged configuration to the engaged configuration responsive to receipt of the trigger signal from the sensor assembly, wherein the actuator assembly moves the brake cam towards the brake pad without moving the brake pad relative to the housing.

2. The safety brake of claim 1, wherein the brake assembly is a resettable brake assembly configured to be selectively and repeatedly transitioned between the disengaged configuration and the engaged configuration.

3. The safety brake of claim 1, wherein, when in the engaged configuration, the brake cam is at least one of:

(i) free from engagement with teeth of the circular saw blade; and (ii) spaced apart from the teeth of the circular saw blade.

4. The safety brake of claim 1, wherein the brake cam is configured to rotate about a cam axis of rotation to selectively transition between the disengaged configuration and the engaged configuration, wherein the blade-receiving region is a planar blade-receiving region, and further wherein the cam axis of rotation is parallel to the planar blade-receiving region.

5. The safety brake of claim 1, wherein a cam axis of rotation of the brake cam is perpendicular to an actuation axis of the actuator assembly.

6. The safety brake of claim 1, wherein the brake cam includes a cam-biasing mechanism that biases the brake cam toward the disengaged configuration.

7. The safety brake of claim 1, wherein:

the brake cam defines a blade-engaging surface configured to operatively engage the planar side surface of the circular saw blade; and the blade-engaging surface defines a region of increasing radius and a region of constant radius, wherein the brake cam is configured initially to operatively engage the circular saw blade with the region of increasing radius and subsequently to operatively engage the circular saw blade with the region of constant radius.

8. The safety brake of claim 1, wherein, subsequent to being transitioned from the disengaged configuration to the engaged configuration, the brake cam is shaped to remain in the engaged configuration until the brake cam is released from the engaged configuration by a user of the circular saw.

9. The safety brake of claim 1, wherein the brake assembly includes a stop configured to limit rotation of the brake cam and wherein the stop is distinct from the brake cam and is configured to operatively engage with the brake cam to limit rotation of the brake cam.

10. The safety brake of claim 1, wherein the brake assembly is configured such that, when the brake cam is in the engaged configuration, the blade is compressed between the brake pad and the brake cam.

11. The safety brake of claim 1, wherein the brake pad includes a pivotal pad mount configured to permit limited rotation of the brake pad at least one of:

(i) about at least one pivot axis; and (ii) about a pivot point.

12. The safety brake of claim 11, wherein the pivotal pad mount includes a concave mount component, which defines a concave recessed region, and a convex mount component, which is shaped to be received within the concave recessed region, and further wherein the pivotal pad mount is configured to permit the limited rotation of the brake pad via relative motion between the concave mount component and the convex mount component.

13. The safety brake of claim 1, wherein the safety brake further includes an attachment mechanism configured to operatively attach at least a portion of the safety brake to the circular saw, wherein the attachment mechanism includes a floating attachment mechanism configured to permit the blade-receiving region to operatively translate relative to a remainder of the circular saw.

14. The safety brake of claim 1, wherein the actuator assembly includes an actuator assembly biasing mechanism and a release mechanism, wherein the release mechanism is configured to selectively permit the actuator assembly biasing mechanism to transition the brake cam from the disengaged configuration to the engaged configuration responsive to receipt of the trigger signal.

15. The safety brake of claim 1, wherein:

the safety brake further includes a deflection-mitigating structure configured to resist deflection of the circular saw blade into contact with the brake cam when the circular saw is utilized to cut a workpiece and the brake cam is in the disengaged configuration; and the deflection-mitigating structure includes a deflection-mitigating surface configured to operatively contact the circular saw blade when the circular saw blade is deflected toward the brake cam to resist deflection of the circular saw blade into contact with the brake cam, and further wherein the deflection-mitigating structure includes an electrically insulating structure configured to electrically insulate the deflection-mitigating surface from a remainder of the safety brake.

16. The safety brake of claim 1, wherein the safety brake further includes a reset mechanism configured to selectively transition the brake cam from the engaged configuration to the disengaged configuration.

17. The safety brake of claim 16, wherein the reset mechanism includes an eccentric structure configured to operatively translate the brake cam away from the blade-receiving region.

18. The safety brake of claim 16, wherein the reset mechanism includes a pressure-actuated reset mechanism configured to at least one of:

(i) operatively translate the brake cam away from the blade-receiving region; and (ii) operatively translate the brake pad of the brake assembly away from the blade-receiving region.

19. The safety brake of claim 16, wherein the reset mechanism includes a cam rotation structure configured to selectively rotate the brake cam away from the circular saw blade.

20. A safety brake for a circular saw, the safety brake comprising:

a sensor assembly configured to detect an actuation parameter and to generate a trigger signal responsive to detection of the actuation parameter;

a brake assembly including:

(i) a brake cam configured to selectively transition between a disengaged configuration in which the brake cam is spaced apart from a blade-receiving region of the safety brake, wherein the blade-receiving region is configured to receive a circular saw blade, and an engaged configuration in which the brake cam extends into the blade-receiving region and is configured to operatively engage a planar side surface of the circular saw blade and thus to resist rotation of the circular saw blade; and (ii) a brake pad that includes a pad friction material, wherein the brake pad is positioned, relative to the brake cam, such that the pad friction material faces toward the brake cam; and an actuator assembly configured to selectively transition the brake cam from the disengaged configuration to the engaged configuration responsive to receipt of the trigger signal from the sensor assembly;

wherein the actuator assembly includes an actuator solenoid that includes a solenoid armature, wherein the solenoid armature is configured to operatively engage the brake cam to transition the brake cam from the disengaged configuration to the engaged configuration and wherein the solenoid armature is in direct physical contact with the brake cam as the actuator assembly transitions the brake cam from the disengaged configuration to the engaged configuration.

21. A method of operating a circular saw, the method comprising:

rotating a circular saw blade of the circular saw;

detecting, with a sensor assembly of the circular saw, that a distance between an individual and the circular saw blade is less than a threshold distance; and responsive to the detecting, stopping rotation of the circular saw blade utilizing a brake assembly of the circular saw, wherein the brake assembly includes a housing, a brake cam and a brake pad, and further wherein the stopping includes operatively engaging a planar side surface of the circular saw blade with the brake cam by moving the brake cam relative to the housing toward the brake pad without moving the brake pad relative to the housing and compressing the circular saw blade between the brake cam and the brake pad to stop rotation of the circular saw blade.

* * * * *